United States Patent
Snyder

(10) Patent No.: US 10,963,831 B2
(45) Date of Patent: Mar. 30, 2021

(54) HEALTHCARE SMALL PACKAGE ON-BOARDING PROCESS AND PROCEDURES AND SYSTEMS, METHODS, AND COMPUTER PROGRAM PRODUCTS FOR PROVIDING THE SAME

(71) Applicant: United Parcel Service of America, Inc., Atlanta, GA (US)

(72) Inventor: Todd Snyder, Anaheim, CA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 932 days.

(21) Appl. No.: 14/601,777

(22) Filed: Jan. 21, 2015

(65) Prior Publication Data
US 2015/0206097 A1    Jul. 23, 2015

Related U.S. Application Data

(60) Provisional application No. 61/929,824, filed on Jan. 21, 2014.

(51) Int. Cl.
  *G06Q 10/08* (2012.01)
  *G06Q 10/10* (2012.01)
(52) U.S. Cl.
  CPC ......... *G06Q 10/0834* (2013.01); *G06Q 10/10* (2013.01)
(58) Field of Classification Search
  CPC ............................. G06Q 10/0834; G06Q 50/22
  See application file for complete search history.

(56) References Cited

U.S. PATENT DOCUMENTS

| | | |
|---|---|---|
| 6,526,392 B1 | 2/2003 | Dietrich et al. |
| 6,963,854 B1 | 11/2005 | Boyd et al. |
| 7,415,437 B2 | 8/2008 | Marvin, III et al. |
| 7,496,519 B2 | 2/2009 | Hahn-Carlson et al. |

(Continued)

OTHER PUBLICATIONS

R.Uthayakunnar, Pharmaceutical supply chain and inventory management strategies: Optimization for a pharmaceutical company and a hospital, 2013, 1-3 (Year: 2013).*

*Primary Examiner* — Kevin H Flynn
*Assistant Examiner* — Ibrahim N El-Bathy
(74) *Attorney, Agent, or Firm* — Shook, Hardy & Bacon L.L.P.

(57) ABSTRACT

Various embodiments of the present invention are directed to concepts for on-boarding potential new customers for a carrier, wherein each potential new client has unique requirements. A method for on-boarding new clients comprises steps for identifying the unique requirements of the potential new customer by comparing the new customer's business model against identified issues common to entities having similar business models. Based on the identified unique requirements of the potential new customer, instructions for implementing required special procedures are generated. A pricing strategy is generated based on the identified customer requirements and any special procedures necessary for implementation of the customer requirements. During implementation, the provided services are monitored, and reports and/or alerts are generated for the customer and/or the carrier. Moreover, the identified issues common to certain business models may be updated to reflect new issues identified during implementation of the service.

17 Claims, 18 Drawing Sheets

(56) References Cited

U.S. PATENT DOCUMENTS

| | | | |
|---|---|---|---|
| 8,249,999 B2 | 8/2012 | Dakar et al. | |
| 8,255,257 B2 | 8/2012 | Bhatt | |
| 8,412,559 B2 | 4/2013 | Hearnes, II | |
| 8,606,696 B1 | 12/2013 | Halpern | |
| 9,443,219 B1* | 9/2016 | Griffith | G06Q 30/0203 |
| 2002/0116318 A1* | 8/2002 | Thomas | G06Q 10/08 |
| | | | 705/37 |
| 2003/0233267 A1 | 12/2003 | Hertel-Szabadi | |
| 2003/0236692 A1 | 12/2003 | Hertel-Szabadi | |
| 2004/0083115 A1 | 4/2004 | Hodges et al. | |
| 2004/0107110 A1* | 6/2004 | Gottlieb | G06Q 10/025 |
| | | | 705/6 |
| 2005/0010459 A1 | 1/2005 | Kawabata et al. | |
| 2005/0171738 A1* | 8/2005 | Kadaba | G06K 19/0717 |
| | | | 702/187 |
| 2005/0261935 A1* | 11/2005 | Silverbrook | G06Q 10/087 |
| | | | 705/2 |
| 2008/0004995 A1* | 1/2008 | Klingenberg | G06Q 10/08 |
| | | | 705/28 |
| 2013/0124243 A1 | 5/2013 | Johnson et al. | |
| 2013/0124244 A1 | 5/2013 | Johnson et al. | |
| 2013/0179228 A1 | 7/2013 | Hearnes, II | |
| 2014/0067665 A1* | 3/2014 | Paletz | G07B 17/00435 |
| | | | 705/40 |
| 2015/0039347 A1* | 2/2015 | Sharma | G06Q 10/0833 |
| | | | 705/4 |
| 2015/0046364 A1* | 2/2015 | Kriss | G06Q 10/0833 |
| | | | 705/333 |

\* cited by examiner

Sales / Solutions Preliminary Scoping

- [ ] Completed Prior to Submitting PQR
- [ ] Completed Prior to Submitting RFP
- [ ] Completed Prior to Submitting Unsolicited Offer

| | UPS/Customer Business Process Touch-Points | Core Solution | Customized Solution | Cost | Comments |
|---|---|---|---|---|---|
| [ ] | Manifesting Solutions: WorldShip, CampusShip, ConnectShip, UPS Ready Vendor, CVR, iShip, CrossWare, Ship API, EMT, Host, Internet Shipping, Worldease, Paperless Invoice, Import Control | [ ] | [ ] | | |
| [ ] | Billing Solutions: Billing Ctr, UBD, BAT, EDI, Customized Solution | [ ] | [ ] | | |
| [ ] | Visibility Solutions Needed: QVM, QVM For Importers, QVN, QVD, CVR, QV Custom, SampleSure, Proactive Response, UPS OnLine Tools | [ ] | [ ] | | |
| [ ] | Reporting Needs: QVM, CVR, QVC, Global, OLT, MyChoice | [ ] | [ ] | | |
| [ ] | Signature/POD Services: UPS.com, API, QV, SampleSure, Complete View POD | [ ] | [ ] | | |
| [ ] | Reverse Logistics: ROW, Returns Exchange, Flexible Access, TrackPad | [ ] | [ ] | | |
| [ ] | Field Resource Needs: Shipping, Returns, UPS Store | [ ] | [ ] | | |
| [ ] | Sustainability Services, Package Design and Test Lab, Warehouse Layout and Design, Network Optimization, Business Process Reengineering, Label Services | [ ] | [ ] | | |
| [ ] | SOPs needed for Delivery/Pickup: (Early Delivery, Delivery Windows, Inside Delivery, CPaD, TNT Enhancements, Sat Delivery for Non Sat Area, EAM Delivery for Non EAM Area, On Site Scanning, On Site Employees) | [ ] | [ ] | | |
| [ ] | Peak SOPs | [ ] | [ ] | | |
| [ ] | Direct Ship/Bypass/Drop Ship | [ ] | [ ] | | |
| [ ] | Special Needs: Cold Chain, HazMat, UPS CapCorp, Service Parts Logistics | [ ] | [ ] | | |
| [ ] | Security Engaged for Risk Profile | [ ] | [ ] | | |
| [ ] | Program Management/Project Management PMO Needed | [ ] | [ ] | | |

| UPS/Customer Business Process Touch-point | Task/Checkpoint |
|---|---|
| ☐ Win Communicated to Stakeholders | Ensure that proper stakeholders are notified regarding HC Small Package win (see communication list in Implementation MCP). |
| ☐ UPS Project Resource Assignment | Ensure that the Project Resources are defined and allocated for their expected dispatch (SOLDI, CF, Operations, etc.) This should extend beyond US Domestic Resources, ensure ownership in other regions as well as resource availability and committment globally. |
| | ☐ Define the Primary PM responsible for the upper-most parent project. Sub-PMs will be identified as PMs for various components of the overall parent project and report status into the Primary PM. |
| | ☐ Business Development |
| | ☐ Small Package OperationsAE |
| | ☐ Special Operating Plans Team |
| | ☐ Haz. Max SME |
| | ☐ Customer Solutions |
| ☐ Define Implementation Governance | Governance Tasks below completed |
| | ☐ Communication Plans |
| | ☐ Change Control Procedures |
| | ☐ Escalation Procedures to senior mgmt (point person for operations) |
| | ☐ Issues Log/Tracking |
| | ☐ Risk Assessment |
| | ☐ Project Progress Reporting Requirements and Metrics |
| | ☐ Criteria for Close-out. |
| ☐ Internal Kick-off | Outline the project and its deliverables; Clarify the expectations, roles, and responsibilities of project resources; Outline the governance plan for the project; Confirm Project Plan and Timeline |
| | ☐ Review Governance Items |
| | ☐ Roles defined |
| | ☐ Review solution with interal stakeholders |
| | ☐ Special Operating Plans Team required |
| | ☐ Governance plan |
| | ☐ Project plan and timelines |
| | ☐ Determine customer kick-off participants/stakeholders |
| ☐ Customer Kick-off | Clarify the expectations, roles, and responsibilities of project resources; outline the governance plan for the project |
| | ☐ Review Governance Items |
| | ☐ Review scope of project to ensure alignment |
| | ☐ Review any special operating plans |

| | | |
|---|---|---|
| | ☐ | Project plan review |
| ☐ BD & Solutions | | Ensure that the following tasks have been completed by BD and Solutions resources engaged |
| | ☐ | Packaging Supplies (Replenishment scheme, constructing of UPS Express Boxes (labor)) |
| | ☐ | Registration Services (RTS, DCR, ABB, SBB, LIDI, Negotiated Rates, etc...) |
| | ☐ | Program Management assessment (Short/Long-term) |
| | ☐ | ADL (UPS Store) |
| | ☐ | PLD indicator for cold chain |
| | ☐ | KPIs defined |
| | ☐ | Chain of Custody (WMS, Track Pad, ECSS, GSS, DIAD, Delivery Link, Sample Sure...) |
| ☐ BD/Solutions/Security | | Security - did Security review occur? Engage to ensure that rick profile is completed. |
| ☐ Contract Implementation | | Signed Contract or LOI; UPS Legal Review, If applicable; Non-disclosure(s) If applicable |
| | ☐ | Pricing Plan determined and in place |
| | ☐ | UPS Account Number(s) set-up (For New Direct Ship Accounts, Accounts are input and coded correctly per Corp Sales Ops. For Drop Ships, the Drop Ship check list is completed and approved) |
| | ☐ | Payment Plan determined and in place |
| | ☐ | Billing options/solution considered |
| | ☐ | Customer prioritization of site(s) if multiple |
| | ☐ | For high volume signature required shippers, determine if they have the need for shipper release and if so move forward with contract |
| | ☐ | Confirmation of all customer shipping groups (Distribution Ctr, Front Office, Field Reps, etc...) |
| | ☐ | Customer's IT Requirements Documented, by location, by user group (Inclusive of technology needs as they apply to Customer Service Representatives (CSR's) within the client locations) |
| | ☐ | Determine that a proposed technology is available in all of the Regions that the customer has locations. |
| | ☐ | Ensure customers are assigning resources to ensure smooth technology implementation |

FIG. 12A
CONTINUED

| | UPS/Customer Business Process Touch-point | Task/Checkpoint |
|---|---|---|
| | | ☐ ICDR sign-offs (if applicable) |
| | | ☐ Walk through registration services with the account, for example do they want the ability to pay the on demand pickup fee for returns |
| | | ☐ Signed power of attorney for international shipments |
| | | ☐ Confirm Customer expectations as to timeline |
| | | ☐ Coordinate UPS SAE/AE involvement via WEBCI (including call with Corporate and Region coordinators prior to WebCI launch) |
| | | ☐ Develop specific instructions for UPS SEA/AE involvment/responsibilities |
| | | ☐ Determine Customer SiteVisit Schedule |
| ☐ | UPS Operations | Determine Customer Pick-up Time Requirements |
| | | ☐ Confirm Pick-up/Delivery established in DIAD |
| | | ☐ Confirm available dock space at customer location |
| | | ☐ Confirm customer dock space/time procedures |
| | | ☐ Determine Customer inside Pick-up Requirements |
| | | ☐ Confirm packages needing Signature Required; an not available for Driver Release, etc... |
| | | ☐ Confirm Feeder Drop times (if applicable) |
| | | ☐ Confirm Feeder Pick-up times (if applicable) |
| | | ☐ Determine any "Peak" scheduling that may need to be considered |
| | | ☐ Determine schedule of "closed" or shut-down days |
| | | ☐ Determine impacts to SP sorts |
| | | ☐ Determine impact to Smalls sorts |
| | | ☐ If ICAN is a requirement, schedule doors, training and implementation |
| | | ☐ Assess the need for Direct/Bypass load(s) at the customer |
| | | ☐ Ensure UPS Service provider is aware of any special requirements at p/u site and introduce SP to customer |
| | | ☐ Security visit for high value, high risk products to review labeling and pick-up methods |
| | | ☐ Operations/IE on-site for start-up |
| | | ☐ Create SOP (include a sign off sheet for all impacted parties) |
| | | ☐ Determine Campus Pick-up locations (include customer contact number(s) for operations) |
| | | ☐ For excessive damages, refer shipper to UPS Package Test Lab |
| | | ☐ Order Shipping Supplies |
| | | ☐ SOP ownership, changes over time |
| | | ☐ Equipment assessment (Refer needs) |

FIG. 12B

| | | |
|---|---|---|
| | | ☐ Smalls (evaluate NGSSI) |
| | | ☐ GPS, Geo Fencing |
| | | ☐ Contingency Planning |
| | | ☐ Need for on-site scanning (ECSS or TUNDRA) |
| | | ☐ E2DC messaging (Address masking, Package Exception processes, Pharma Damage Processing Form 106 |
| | | ☐ Loss prevention/Security assessment (DEA) |
| | | ☐ ECSS (SLIC, Labor, Hardware, T&C) |
| | | ☐ Weather (ISDN), Material Event Management, Spot Light Reporting and recovery |
| ☐ | Special Operations (If needed) | |
| | | ☐ Review Special Operation to determine if involvement needed (communicate with Special Ops Team in implementation MOP) - review high level criteria below (If yes, then ensure Special Ops is engaged) |
| | | ☐ Inside delivery |
| | | ☐ Delivery Window required? (Pharma Samples, Storage Unit) |
| | | ☐ Shipping TnT enhancements |
| | | ☐ Saturday delivery for non Saturday |
| | | ☐ Early AM deliveries for non Early AM |
| | | ☐ Unique cold chain requirements |
| | | ☐ Special operations Approval request submitted |
| ☐ | Customer Service | Customer Contact |
| | | ☐ Ensure Tuscon support center aligned for HC accounts |
| | | ☐ Establish vanity email and 900# (newclient@ups.com) |
| | | ☐ Training Plan Elements (Shipping, tracking, etc.) |
| | | ☐ Define Training |
| | | ☐ Define Training Groups/Locations |
| | | ☐ Conduct Training |
| | | ☐ Introduce CSC if applicable |
| | | ☐ Position Signature Tracking for POD |
| | | ☐ Position QV suite of products |
| | | ☐ Position EDI services for POD |
| | | ☐ UPS "trinketkey chain" table day |
| ☐ | Reporting | What are reporting expectations |
| | | Reporting requirements defined |

| UPS/Customer Business Process Touch-point | Task/Checkpoint |
|---|---|
| | Performance reports defined |
| ☐ CampusShip | Define User Groups |
| | ☐ Determine required shipper numbers |
| | ☐ Define Training |
| | ☐ Define Training Groups/Locations |
| | ☐ Conduct Training |
| | ☐ Introduce CSC if applicable |
| | ☐ UPS "trinket/key chain" table day |
| ☐ UPS Worldship | UPS account number set-up |
| | ☐ Determine H/W Requirements |
| | ☐ CTP Contract enacted |
| | ☐ Order H/W |
| | ☐ Determine Customer IT Platform |
| | ☐ Determine data requirements |
| | ☐ Determine Worldship configurable Field Settings |
| | ☐ Determine Intl needs/settings (TD etc.) |
| | ☐ Determine need for Crossware |
| | ☐ Determine Need for HazMat Shipping |
| | ☐ Provide listing of UN Codes for regulated shipping |
| | ☐ Gather MSDS Information for Dangerous Goods Shipment |
| | ☐ Certify the shipper as a HazMat Shipper (if applicable) |
| | ☐ Define Training |
| | ☐ DefineTraining Groups/Locations |
| | ☐ Conduct Training |
| | ☐ Introduce CSC and support resources if applicable |
| | ☐ UPS "trinket/key chain" table day |
| ☐ Field Shipping/Returns | Determine the needs of field resources |
| | ☐ Determine if Returns plays a role |
| | ☐ Determine service level of returns. If product is refrigerated, default of 3DS is not the solution |
| | ☐ Listing of Remote Users and addresses |
| | ☐ Determine access methods - IT |
| | ☐ Determine access Methods - Physical |
| | ☐ Define Training |
| | ☐ Define Training Groups/Locations |

FIG. 12C

HEALTHCARE SMALL PACKAGE ON-BOARDING PROCESS AND PROCEDURES AND SYSTEMS, METHODS, AND COMPUTER PROGRAM PRODUCTS FOR PROVIDING THE SAME

CROSS-REFERENCE TO RELATED APPLICATIONS

This patent application claims priority to provisional patent application Ser. No. 61/929,824 filed Jan. 21, 2014, the contents of which are hereby incorporated herein by reference in their entirety.

BACKGROUND

Common carrier service providers have conventionally sought to manage the on-boarding (i.e., establishment) of new customers, markets, and the like by seeking to ensure that as many customer requirements, exceptions, and the like are handled and/or resolved as early as possible during the engagement process. Historically, a comprehensive process has not existed to sufficiently identify customer requirements, to identify and appropriately handle exceptions and/or variations requested by customers, and/or to involve all necessary management and personnel in a consolidated and up-front manner so as to facilitate a coordinated process flow. This is true across multiple and various markets, although the healthcare industry involving a plurality of small packages provides an exemplary non-limiting application. Thus, therein and elsewhere, a need exists for a comprehensive on-boarding process and one or more tools associated therewith to facilitate more efficient, accurate, and effective procedures, for example in the context of package shipment handling activities.

BRIEF SUMMARY

Various embodiments of the present invention are directed to systems for developing customer-specific service solutions for providing transportation services for health-care related items by a carrier. In various embodiments, the system comprises: one or more memory storage areas containing operational data indicative of one or more general services offered by the carrier and/or requirements for shipping one or more health-care related items; and one or more processors collectively configured to: receive customer requirement data indicative of requested services for a customer; generate an inquiry regarding one or more possible service criteria for the requested services to be presented to the customer; receive a response indicative of at least one service criteria selected from the one or more possible service criteria; determine, based at least in part on the response, whether the requested services may be satisfied by the one or more general services; and generate special operations instructions indicative of and configured to facilitate implementation of one or more special operations necessary to satisfy customer requirements upon a determination that the requested services cannot be satisfied by the general services. Various embodiments are additionally configured to generate a pricing structure for the requested services, and the processors may determine whether the pricing structure satisfies the cost to implement the special operations. In various embodiments, the processors generate an alert to be transmitted to the customer indicative of the pricing structure and the special operations data.

In various embodiments, the system is additionally configured to identify appropriate personnel associated with the carrier to be responsible for the requested services, and to generate, based at least in part on the response data, one or more key performance indicators for the requested services; receive implementation data indicative of the status of one or more requested services being implemented; and generate an alert upon the occurrence of a trigger event, and to update the operational data to reflect changes in the implementation data. The processors are additionally configured to generate a report to be transmitted to the customer in certain embodiments. Moreover, in certain embodiments, the processors are further configured to: receive regulatory data indicative of updates to requirements for shipping one or more healthcare related items; and update, based at least in part on the regulatory data, the operational data.

Other embodiments of the present invention are directed to computer-implemented methods for developing customer-specific solutions. Various embodiments of the method comprise steps to: receive customer requirement data indicative of requested services for a customer; generate an inquiry regarding one or more possible service criteria for the requested services to be presented to the customer; receive a response indicative of at least one service criteria selected from the one or more possible service criteria; determine, based at least in part on the response, whether the requested services may be satisfied by the one or more general services; and generate special operations instructions indicative of and configured to facilitate implementation of one or more special operations necessary to satisfy customer requirements upon a determination that the requested services cannot be satisfied by the general services. Various embodiments are additionally configured to generate a pricing structure for the requested services, and the processors may determine whether the pricing structure satisfies the cost to implement the special operations. In various embodiments, the processors generate an alert to be transmitted to the customer indicative of the pricing structure and the special operations data.

Other embodiments of the present invention are directed to a non-transitory computer-readable storage medium having computer-readable program code portions embodied therein. The computer-readable program code portions comprise executable portions configured to: receive customer requirement data indicative of requested services for a customer; generate an inquiry regarding one or more possible service criteria for the requested services to be presented to the customer; receive a response indicative of at least one service criteria selected from the one or more possible service criteria; determine, based at least in part on the response, whether the requested services may be satisfied by the one or more general services; and generate special operations instructions indicative of and configured to facilitate implementation of one or more special operations necessary to satisfy customer requirements upon a determination that the requested services cannot be satisfied by the general services. Various embodiments are additionally configured to generate a pricing structure for the requested services, and the processors may determine whether the pricing structure satisfies the cost to implement the special operations. In various embodiments, the processors generate an alert to be transmitted to the customer indicative of the pricing structure and the special operations data.

BRIEF DESCRIPTION OF THE SEVERAL VIEWS OF THE DRAWINGS

Reference will now be made to the accompanying drawings, which are not necessarily drawn to scale, and wherein:

FIG. 11 is an exemplary checklist 1100 that may be utilized by a solution tool decision engine according to various embodiments of the present invention; and FIGS. 12A-12C are additional exemplary checklists 1200A-1200C that may be utilized by a solution tool decision engine according to various embodiments of the present invention.

DETAILED DESCRIPTION

Figure 1:
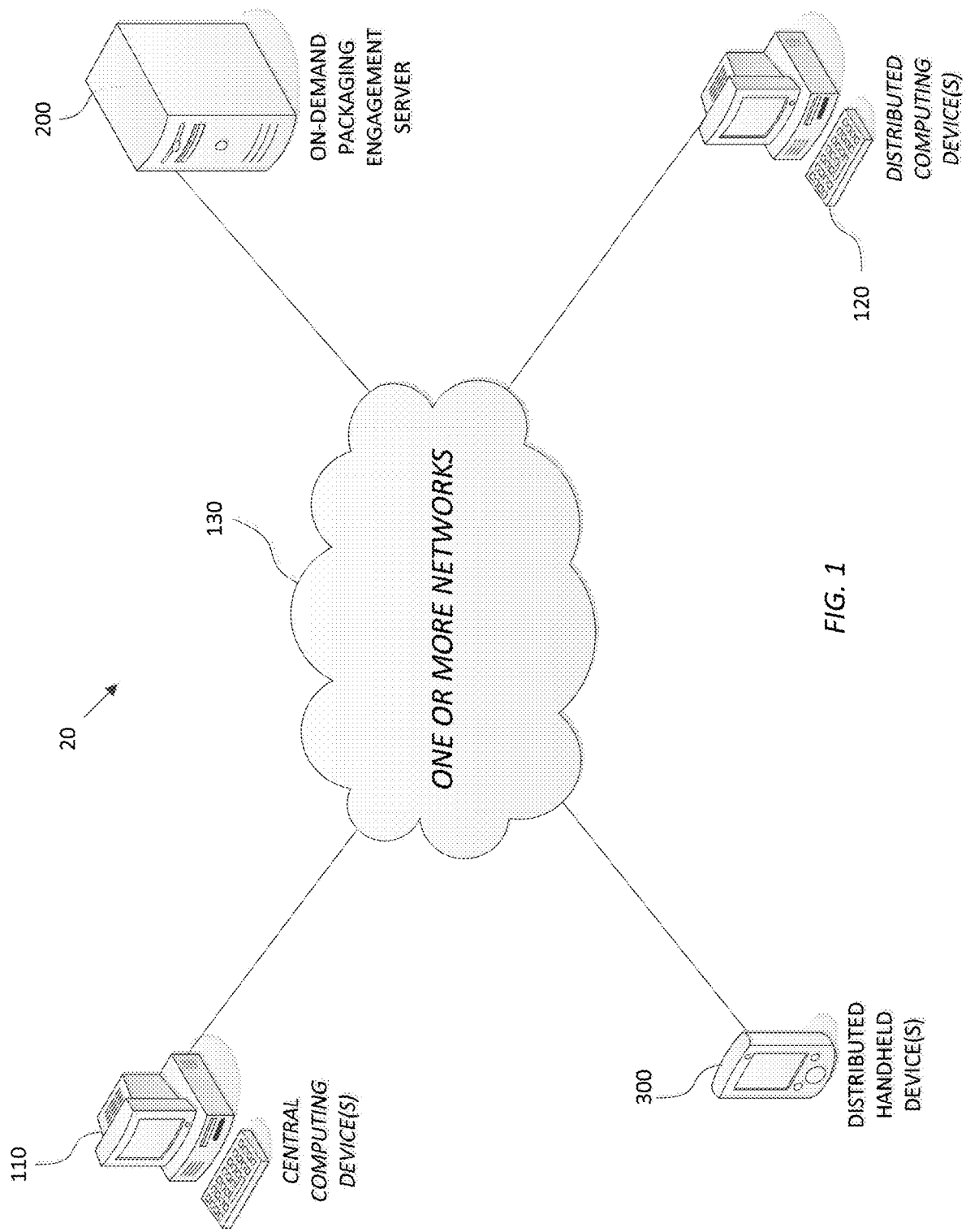
FIG. 1 is a block diagram of a system 20 according to various embodiments.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Generally speaking, various embodiments utilize repeatable models for on-boarding of customers and/or potential customers (referred to herein for the sake of clarity as "customers"), particularly and as a non-limiting example those in the healthcare industry. A documented process is provided that personnel associated with a common carrier service provider (referred to herein as the "carrier"), such as all project managers and on-boarding teams, follow. Roles are defined based on customer requirements, and personnel are trained accordingly. One or more standardized tools may be used, such as operational data comprising pre-generated on-boarding checklists and/or project planning templates configured to pre-populate one or more customer criteria based upon the identified customer requirements, context, or otherwise. In this manner, various embodiments are configured, as non-limiting examples, to align client requirements and client subject matter experts and stakeholders to a project team associated with the common carrier service provider (referred to herein as the "carrier") in early and initial planning stages so as to ensure mutual success.

Exemplary and non-limiting process toolkits or standardized tools may include a tool to gather initial customer requirements, exceptions, and the like identified during an initial engagement meeting with the customer; a tool to validate requirements against external data such as third party regulations and the like, a tool to determine pricing structure and strategy based at least in part upon the requirements, exceptions, and the validation thereof, and a tool to notify and/or align personnel to facilitate implementation of the on-boarding plan. A project plan report, checklist, and/or timeline may be generated and/or distributed to one or more parties for consolidated reference and coordination during implementation and/or thereafter. Period timelines and/or checkpoint gates may also be generated and monitored via various embodiments and the tools provided therewith.

Exemplary Apparatuses, Methods, Systems, Computer Program Products, & Computing Entities Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary Architecture of System 20

FIG. 1 is a block diagram of a system 20 that can be used in conjunction with various embodiments of the present invention. In at least the illustrated embodiment, the system 20 may include one or more central computing devices 110, one or more distributed computing devices 120, and one or more distributed handheld or mobile devices 300, all configured in communication with a central server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 110-300 are illustrated in FIG. 1 as communicating with one another over the same network 130, these devices may likewise communicate over multiple, separate networks.

According to one embodiment, in addition to receiving data from the server 200, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130.

Exemplary Server 200

In various embodiments, the server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed device(s) 110, 120, and/or the handheld or mobile device(s) 300, as may be desirable for particular applications. As will be described in further detail below, in at least one embodiment, the handheld or mobile device(s) 300 may contain one or more mobile applications 330 which may be configured so as to provide a user interface for communication with the server 200, all as will be likewise described in further detail below.

Figure 2A:
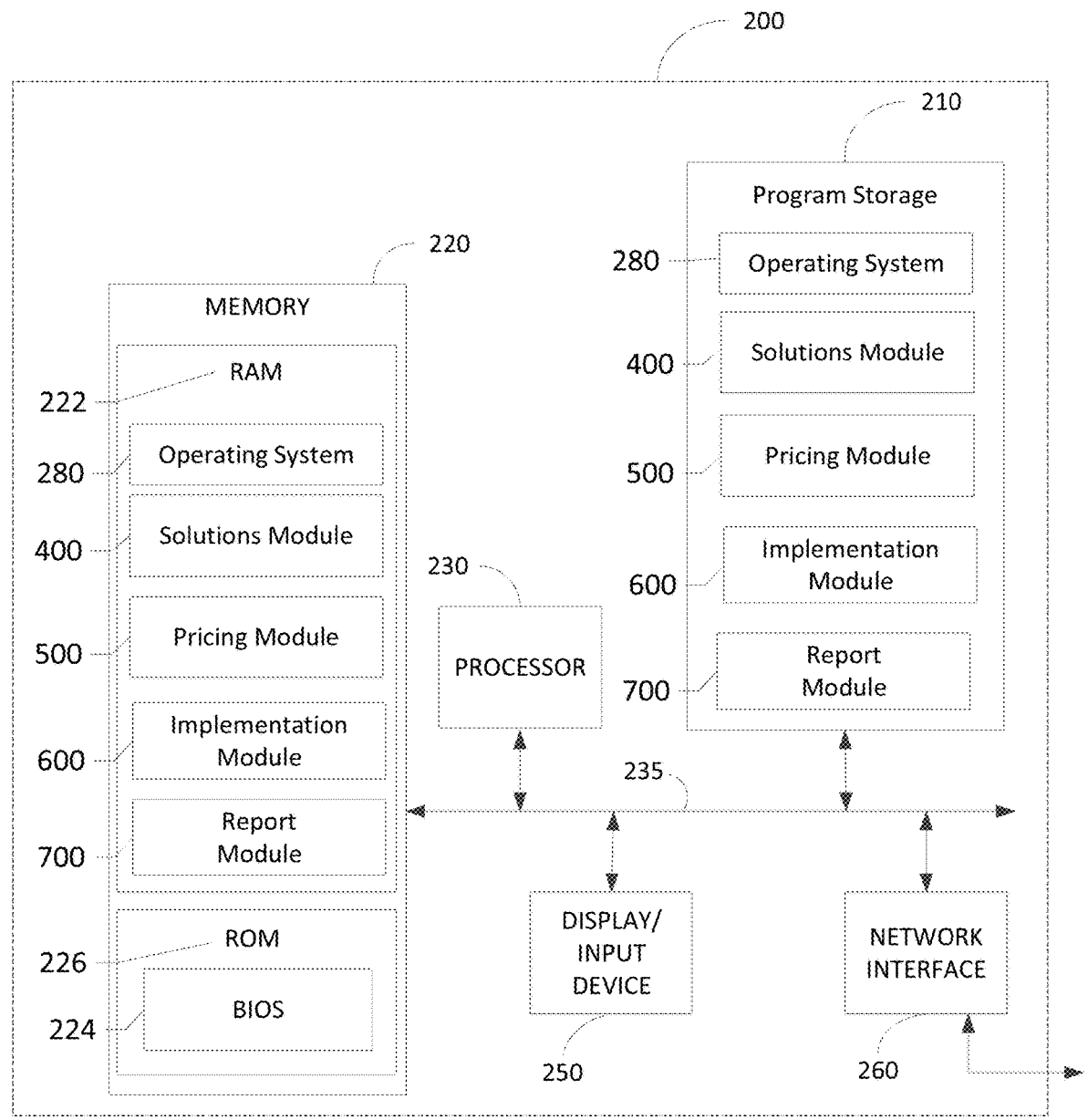
FIG. 2A is schematic block diagram of a server 200 according to various embodiments.

FIG. 2A is a schematic diagram of the server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200. Various ROM and RAM configurations have been previously described herein.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules (e.g., Solutions Module 400, Pricing Module 500, Implementation Module 600, and/or Report Module 700) comprising, for example, one or more computer-readable program code portions executable by the processor 230, may be stored by the various storage devices 210 and within RAM 222. Such program modules may also include an operating system 280. In these and other embodiments, the various modules 400, 500, 600, 700 control certain aspects of the operation of the server 200 with the assistance of the processor 230 and operating system 280. In still other embodiments, it should be understood that one or more additional and/or alternative modules may also be provided, without departing from the scope and nature of the present invention.

In various embodiments, the program modules 400, 500, 600, 700 are executed by the server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed.

In various embodiments, it should also be understood that one or more of the modules 400, 500, 600, 700 may be alternatively and/or additionally (e.g., in duplicate) stored locally on one or more of the devices 110, 120, and/or 300 and may be executed by one or more processors of the same. According to various embodiments, the modules 400, 500, 600, 700 may send data to, receive data from, and utilize data contained in one or more databases (see FIG. 4), which may be comprised of one or more separate, linked and/or networked databases.

Also located within the server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Distributed Handheld (or Mobile) Device(s) 300

Figure 2B:
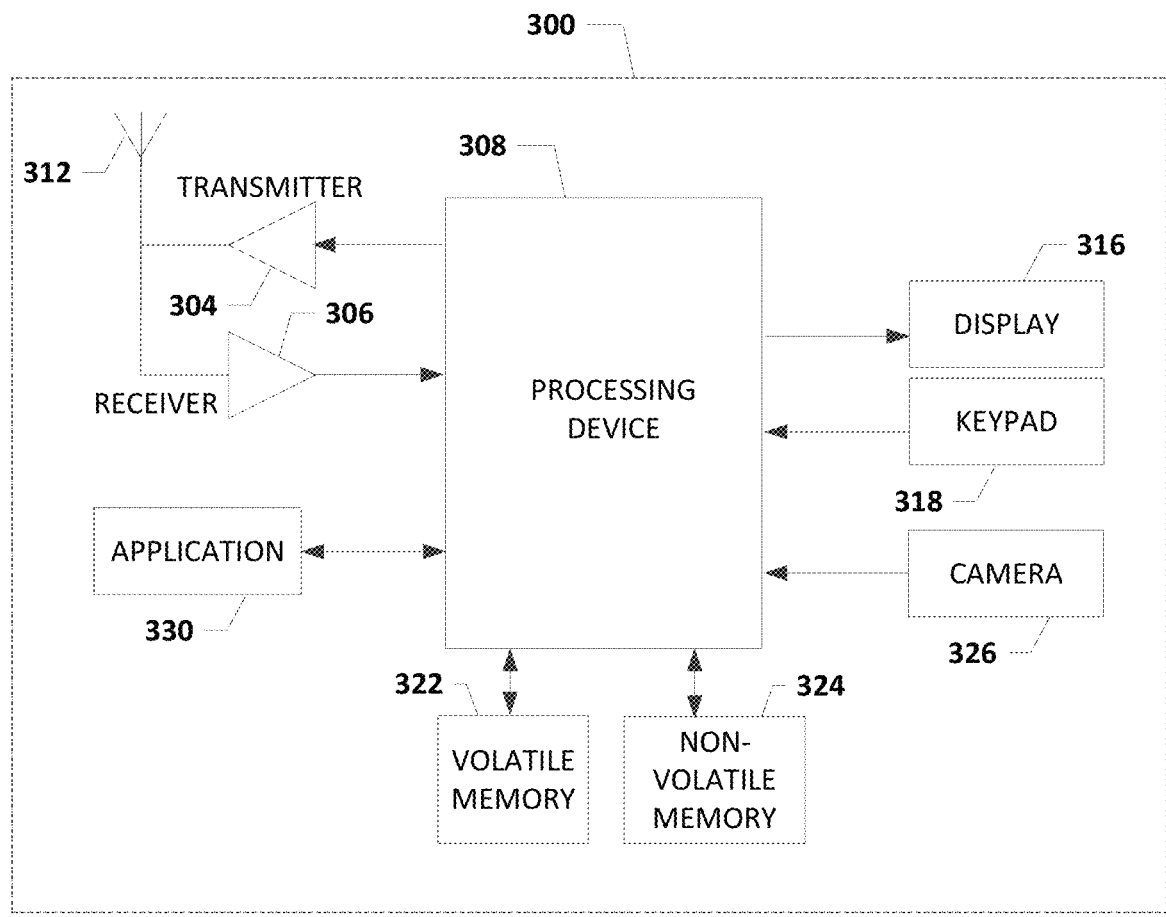
FIG. 2B is schematic block diagram of an exemplary mobile device 300 according to various embodiments.

FIG. 2B provides an illustrative schematic representative of a mobile device 300 that can be used in conjunction with various embodiments of the present invention. Mobile devices 300 can be operated by various parties. As shown in FIG. 2B, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the server 200, the distributed devices 110, 120, and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a camera 326 and a mobile application 330. The camera 326 may be configured according to various embodiments as an additional and/or alternative data collection feature, whereby one or more items may be read, stored, and/or transmitted by the mobile device 300 via the camera. The mobile application 330 may further provide a feature via which various tasks may be performed with the mobile device 300. Various configurations may be provided, as may be desirable for one or more users of the mobile device 300 and the system 20 as a whole.

Server 200 Logic Flow

Figure 3:
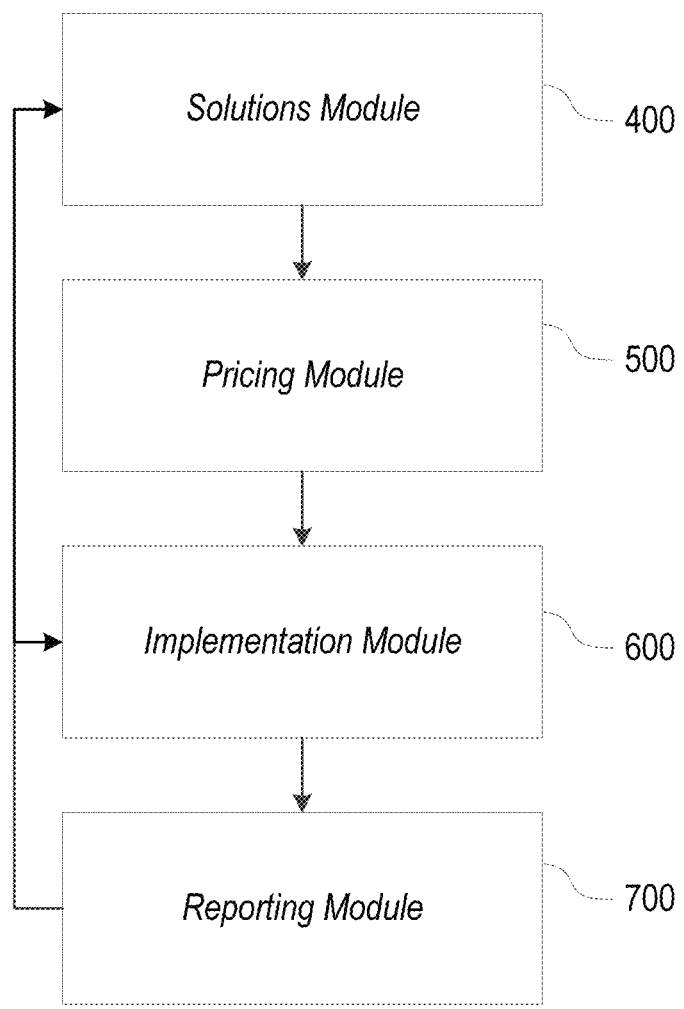
FIG. 3 illustrates an overall process flow for various modules of the server 200 according to various embodiments.

Reference is now made to FIGS. 3-10, which illustrate various logical process flows executed by various embodiments of the modules described previously herein. In particular, FIG. 3 illustrates the overall relationship of the modules 400, 500, 600, 700 of the server 200, according to various embodiments. As illustrated, operation of the system 20 via the server 200 begins, according to various embodiments, with the execution of the solutions module 400 (see also FIG. 5), which receives, stores, manages, and transmits a variety of data, such as the non-limiting examples of customer data 402, standards data 403, and requirements data 415. In various embodiments, the solutions module 400 may be configured to receive data from a customer, such as data indicative of services requested by the customer, and any data provided by the customer in response to one or more inquiries requesting additional detail regarding the requested services. As will be described in greater detail herein, the solutions module 400 may be configured to process and/or analyze the data received from the customer to identify appropriate carrier services to satisfy the customer requirements.

At least portions of the data received and/or generated by the solutions module 400 is provided, as desirable, to the pricing module 500, as will be described in further detail below. Other portions of the data may be provided to one or more tools of the implementation module 600. According to various embodiments, any portion of the data received and/or generated by the solutions module 400 may be exchanged in a one or two directional fashion between any set combinations of the modules 400-700 of the server 200, as may be desirable without departing the scope of the inventive concepts described herein.

Figure 5:
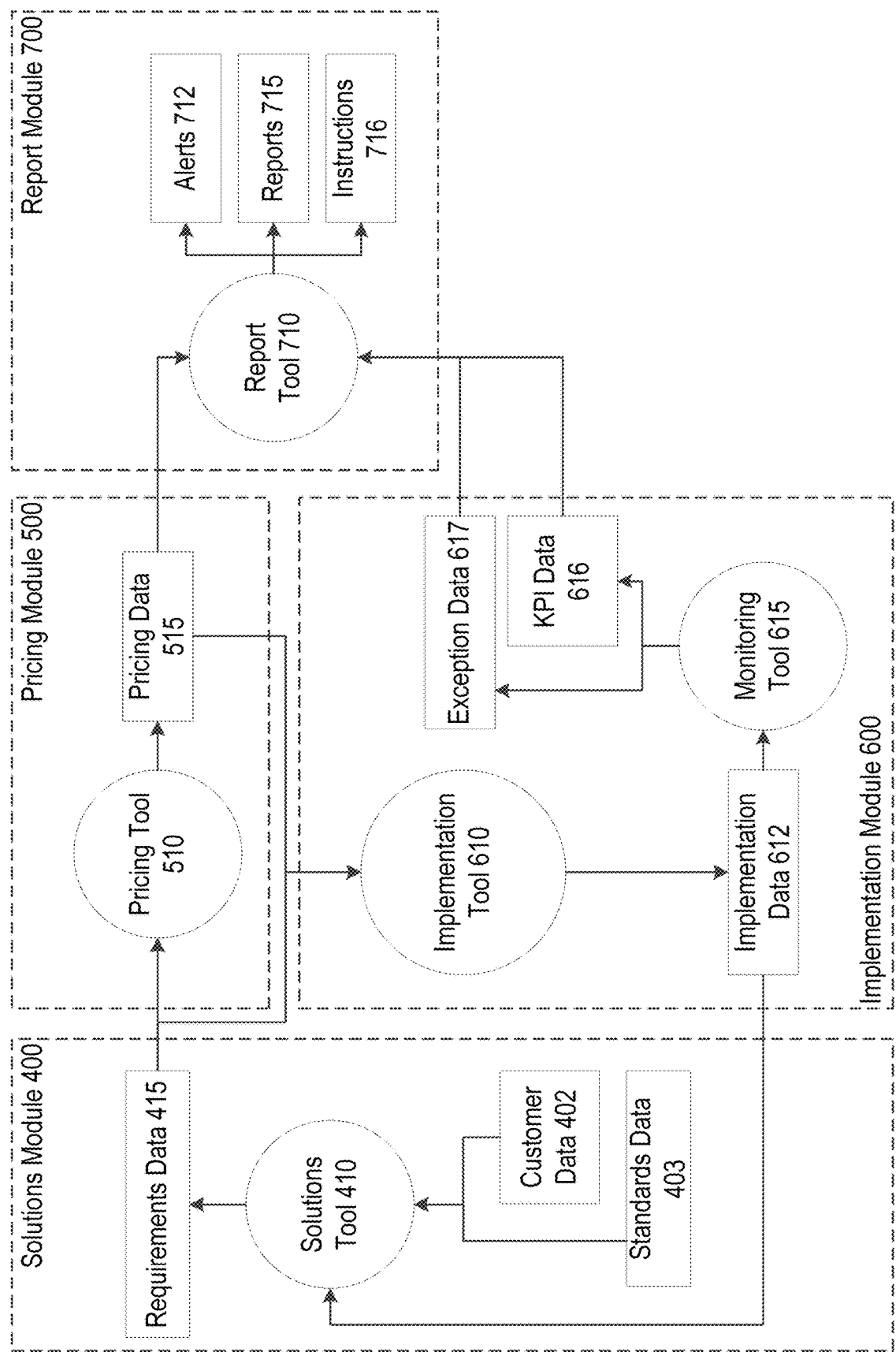
FIG. 5 is a schematic block diagram of a Solutions Module 400, a Pricing Module 500, an Implementation Module 600, and a Report Module 700, all as also illustrated in FIGS. 3 and 5 according to various embodiments.

With continued reference to FIGS. 3 and 5, the pricing module 500 is generally configured according to various embodiments to execute one or more tools (e.g., a pricing tool 510) that ascertain an appropriate pricing structure for services provided according to the requirements identified in the requirements data 415. In certain embodiments, execution of the pricing tool 510 results in pricing data 515, which may be forwarded to the implementation module 600 and/or the report module 700, at least the latter of which being desirable in certain instances for purposes of alerting and/or otherwise notifying one or more users of the system 20 (e.g., carriers, suppliers, and the like) of the pricing data. Further details in this regard will be provided elsewhere herein, but it should be understood that execution of the pricing tool 510 corresponds substantially to the execution of steps 1003-1004 of FIG. 10, as detailed elsewhere herein.

Figure 10:
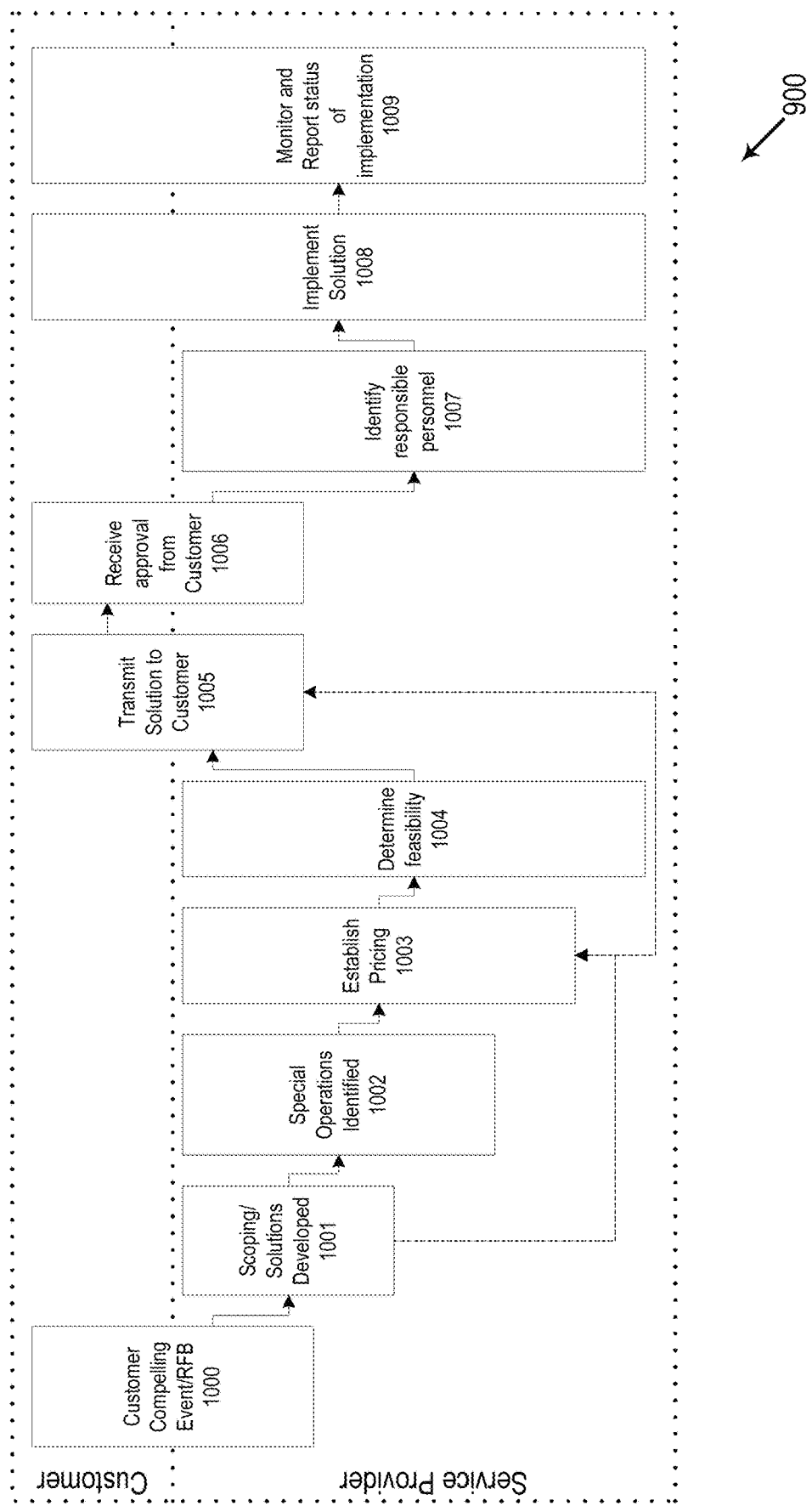
FIG. 10 illustrates an exemplary on-boarding process flow 900 for the system 20 and the representative communications between various parties associated therewith, as may occur according to the various embodiments also illustrated in FIGS. 1-9.

Remaining with FIGS. 3 and 5, the implementation module 600 is generally configured according to various embodiments to execute one or more tools (e.g., an implementation tool 610 and a monitoring tool 615) so as to facilitate the implementation and monitoring of services according to the identified customer requirements (see steps 1005-1009 of FIG. 10, as detailed elsewhere herein). In certain embodiments, the implementation tool is configured to facilitate identification of personnel necessary to implement services according to the customer requirements, and to identify appropriate metrics for determining whether implementation of the services is successful.

The implementation module 600 is generally configured according to various embodiments to, upon execution of the implementation tool 610 and generation of the implementation data 612 (see again FIG. 5), execute the monitoring tool 615, which in turn generates Key Performance Indicator data ("KPI data") 616, and/or exception data 617. The data 616-617 generated by the monitoring tool 615 corresponds substantially to step 1009 of FIG. 10, as detailed elsewhere herein. Various configurations may be envisioned, as within the scope and content of the capabilities of the monitoring tool 615 of the implementation module 600, as will be further detailed herein.

According to various embodiments, upon generation of data 616-617 by the implementation module 600, such is likewise transmitted to at least the report module 700 (see FIGS. 3 and 5), which is configured to generate instructions to a processing device (e.g., processing device 308 of the server 200) to provide periodic or timely alerts 712 and/or reports 715 to one or more users of the system 20, as necessary. Thus, notifications may be generated by a processing device and transmitted to one or more users upon generation of pricing data 515, KPI data 616, and/or exception data 617. Further details in this regard will be provided herein.

Again, as mentioned, the above and other details regarding the modules 400-700 are described in further detail below. Specifically, detailed steps performed by various embodiments of the solutions module 400 are described in relation to FIG. 6; steps performed by various embodiments of the pricing module 500 are described in relation to FIG. 7; steps performed by various embodiments of the implementation module 600 are described in relation to FIG. 8; and steps performed by various embodiments of the report module 700 are described in relation to FIG. 9.

Figure 4:
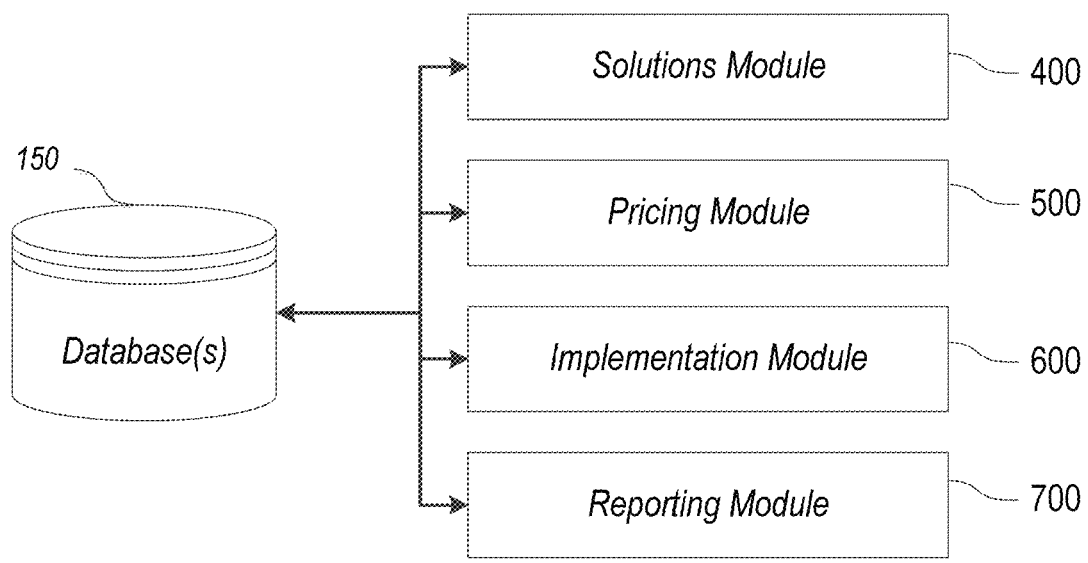
FIG. 4 illustrates a schematic diagram of various modules in communication with a database according to various embodiments.

With reference now to FIG. 4, such illustrates exemplary communications between one or more databases 150 and each of the various modules 400-700. Although the embodiment of FIG. 4 shows these databases 150 as being a single database comprising different types of data in various embodiments, a plurality of separate databases may be utilized to store various data types. In still other embodiments, additional and/or alternative databases may be provided, as may also be desirable for particular applications.

According to various embodiments, the database 150 may be configured to store and maintain a variety of data, such as customer data 402, standards data 403, requirements data 415, pricing data 515, implementation data 612, KPI data 616, exception data 617, and/or the like, as illustrated generally in FIG. 5. Indeed, the database 150 may be configured to store and maintain data provided as input by a user, and/or data generated by one or more components of the system 20.

In all of these and still other embodiments, it should be understood that, upon receipt of at least some portion of data, the database 150 will store any newly received data in a manner accessible by one or more components of the system 20 (e.g., modules 400-700), whether automatically, manually, upon query therefor, whether now or at a later time.

According to various embodiments, at least portions of the customer data 402 (see FIG. 5) may be observed and/or otherwise recorded into the system by customer or common carrier-based personnel, each via one or more mobile devices and/or distributed computing devices of the system 20, as have been described previously herein. In these and other embodiments, it should be understood that, upon receipt of such data 402, the database 150 will store any such data in a manner associated with at least the solutions module 400 and for provision (whether automatically, manually, upon query therefor, whether now or at a later time) to at least one of the modules 500-700, as will also be described in further detail below. Of course, in any of these and still other embodiments, a variety of alternative configurations and/or components of customer data 402 may exist, as may be desirable for certain applications.

According to various embodiments and with continued reference to FIGS. 4 and 5, the database 150 may be configured to store and maintain operational data utilized by various tools (e.g., standards data 403 and/or a solutions tool decision engine utilized by a solutions tool 410, as may be understood with reference in particular to FIG. 5). In certain embodiments, the standards data 403 comprises data indicative of various standard services currently and/or historically offered by the carrier. Such data may comprise a description of one or more services, historical and/or current pricing strategies for the services, profit margins associated with the services, and/or the like. The standards data 403 may additionally and/or alternatively further comprise carrier strategic considerations and assessments, including funding, ROI, value proposition, and positioning strategy data, as non-limiting examples. The standards data may be utilized to determine whether any special requirements are identified by the customer that cannot be addressed by standard services currently and/or historically offered by the carrier. According to various embodiments, at least portions of the standards data 403 may be observed and/or otherwise recorded into the system by common carrier-based personnel, via one or more mobile devices and/or distributed computing devices of the system 20, as have been described previously herein. Moreover, in various embodiments, the standards data 403 may be updated manually and/or automatically in response to a determination that the services offered by the carrier have changed. In these and other embodiments, it should be understood that, upon receipt of such data 403, the database 150 will store any such data in a manner associated with at least the solutions module 400 and for provision (whether automatically, manually, upon query therefor, whether now or at a later time) to at least one of the modules 500-700, as will also be described in further detail below. Of course, in any of these and still other embodiments, a variety of alternative configurations and/or components of standards data 403 may exist, as may be desirable for certain applications.

As an additional non-limiting example, the operational data may comprise a solutions tool decision engine comprising one or more checklists indicating various issues for consideration by a customer when forming customer requirements. As a non-limiting example, the solutions tool decision engine may comprise a preliminary solution scoping checklist and one or more detailed checklists configured to facilitate a detailed determination of the necessary services to be provided to the customer. The preliminary solutions scoping checklist may be configured to facilitate a determination of general services necessary to meet customer requirements, and may facilitate request data generation and transmission to the customer, requesting additional detailed information regarding criteria for implementation of the requested services.

In this regard, FIGS. 11A-12C illustrate exemplary detailed checklists 1100, 1200A-1200C, as may be configured according to various embodiments to facilitate an identification of any detailed criteria for implementation needed by the customer. For example, the detailed checklist 1200A-1200C may be configured to facilitate an identification of personnel necessary to meet the customer requirements, identify appropriate personnel to be utilized in meeting the customer requirements, ensure that carrier personnel have a thorough understanding of the customers' business and/or business location, ensure that standard operating procedures are generated, identify any special operations needed to meet the customer requirements, and/or the like. Moreover, the detailed criteria for implementation may comprise information regarding (1) the sources of orders (e.g., online, telephone, fax, and/or the like); (2) whether addresses are validated at the point of order entry; (3) whether carbon neutral shipping is included; (4) whether negotiated rates must be displayed; (5) whether any materials related to clinical trials are being transported; (6) whether any medical devices are being transported; (7) whether any return shipments to a laboratory are necessary; (8) whether the services include shipments inbound to a hospital; (9) how is cost determined for a customer; (10) whether any hazardous materials are being shipped; (11) whether any shipments requiring refrigeration are being shipped; (12) a classification of service destinations (e.g., commercial, residential, industrial, and/or the like); (13) whether shipping contents are identified and/or certified; (14) whether delivery to a location inside of a delivery address is required; (15) whether specially designed labels are necessary; (16) how are high value shipments monitored; (17) whether the chain of custody of products must be monitored; (18) how are return shipments processed; (19) how are shipments processed; (20) whether a third party payer is involved; whether a standard operating procedure has been established for high value items. Moreover, such checklists may provide one or more proposed solutions for various detailed criteria. Of course, in these and still other embodiments, a variety of alternative configurations and/or components of solutions tool 410 and solutions tool decision engine may exist, as may be desirable for certain applications.

Solutions Module 400

According to various embodiments and as previously mentioned herein, the solutions module 400 is configured to receive, store, manage, and transmit a variety of customer data 402, standards data 403, and/or requirements data 406. Receipt may be from any of a variety of entities (e.g., a carrier, a customer (see all in FIG. 10), or otherwise) and transmission thereof may be to one or more of the modules 500-700, as will be described in further detail below. In certain instances, transmission may be one-way, only to the one or more modules 500-700 for further processing; however, in other embodiments, at least some transmissions may be two-directional, as may be desirable for certain applications. It should also be understood that according to various embodiments, in some instances only a portion of certain types of data 402-403, 415 may be transmitted to particular modules, for example, on an "as-needed" or "as-requested" basis. For example, transmission of requirements data 415 may be a two-part (or more) process, whereby at least a subset of the requirements data 415, such as data indicating certain special procedures are necessary to meet the customer requirements, may be first transmitted to a pricing tool 510 (see FIG. 5), and the entirety of the requirements data 415, indicative of standard carrier procedures, special procedures, and/or the like necessary to meet the customer requirements, may be transmitted to an implementation tool 610. Of course, a variety of alternative configurations for data segregation and transmission may be envisioned, without departing from the scope and nature of the embodiments described herein.

Figure 6:
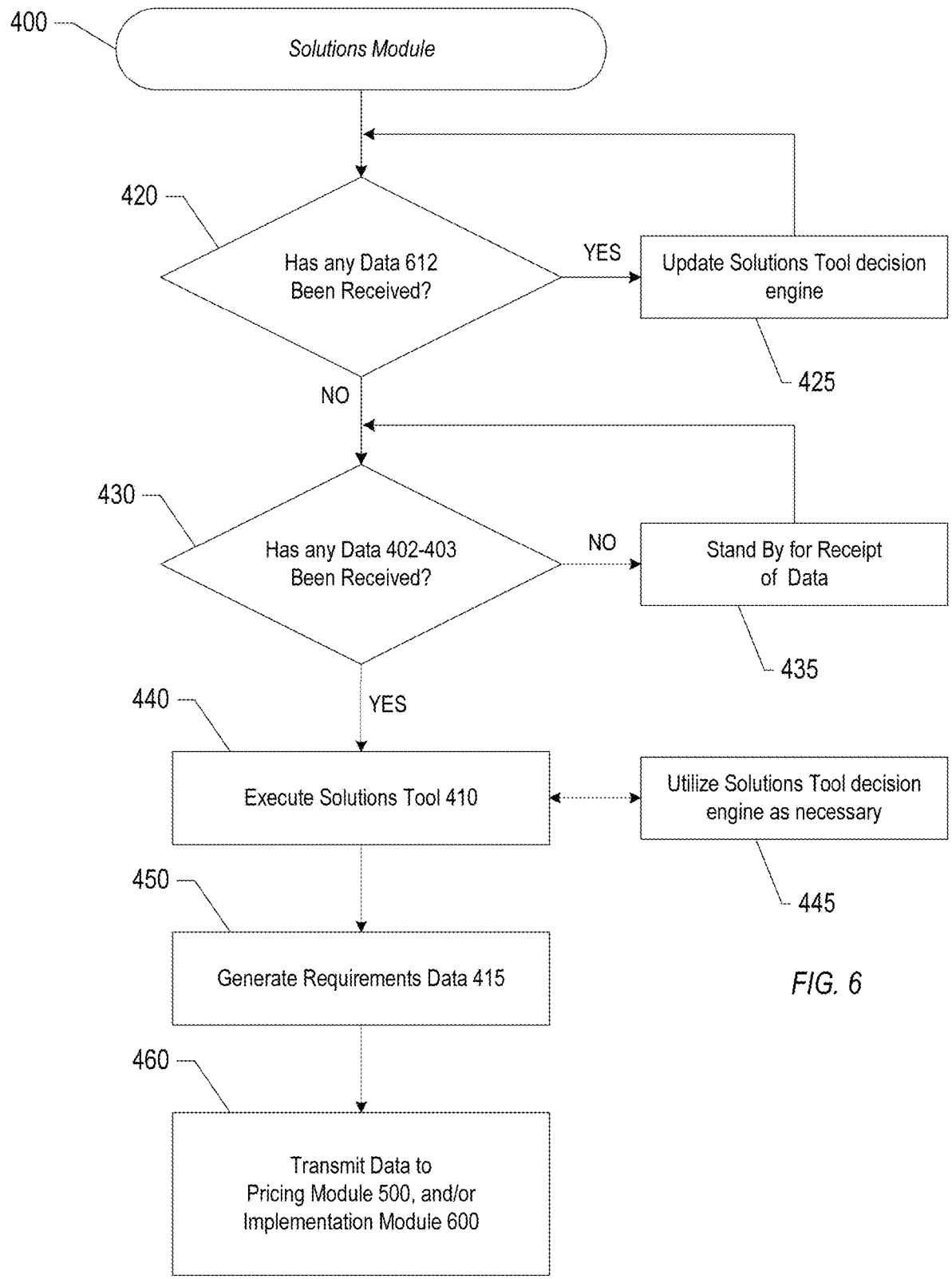
FIG. 6 illustrates an exemplary process flow according to various embodiments for the Solutions Module 400 shown in FIGS. 3 and 5.

That being said, FIG. 6 illustrates non-limiting and exemplary steps that may be executed by the solutions module 400 according to various embodiments. In various embodiments, the solutions module 400 may be configured to ensure updated data is stored in association therewith. Beginning with step 420, the solutions module 400 assesses whether any data (e.g., implementation data 612, described in greater detail herein) has been received by the module. In certain embodiments, the solutions module 400 makes this assessment by periodically scanning one or more databases (see FIG. 4) associated with the module and by identifying some portion of data within one or more of the databases that was not present during a previous periodic scan under step 420. Of course, alternative configurations may be envisioned, wherein, as a non-limiting example, the solutions module 400 may actively receive data (e.g., as input by a user of the system 20 via an interface, whether web-based or otherwise) and upon receipt thereof, execute step 425. As a non-limiting example, the solutions module may be configured according to certain embodiments to automatically update operational data, such as standards data 403 and/or a solutions tool decision engine associated with the solutions tool 410. In various embodiments, updating the operational data may comprise updating one or more data tables, checklists, and/or the like stored in database 150 and referenced by the solutions tool 410 in generating requirements data 415. As illustrated in FIG. 6, after updating the operational data, the solutions tool may proceed to again execute step 420.

Upon a determination at step 420 that no implementation data 612 has been received, the solutions module 400 may proceed to execute step 430, and assess whether any data (e.g., customer data 402 and/or standards data 403) has been received by the module. In certain embodiments, the solutions module 400 makes this assessment by periodically scanning one or more databases (see FIG. 4) associated with the module and by identifying some portion of data within one or more of the databases that was not present during a previous periodic scan under step 430. Of course, alternative configurations may be envisioned, wherein, as a non-limiting example, the solutions module 400 may actively receive data (e.g., as input by a user of the system 20 via an interface, whether web-based or otherwise) and upon receipt thereof, execute step 440. Moreover, in various embodiments, the solutions module 400 may be configured to execute step 430 prior to, or at the same time as steps 420-425 are being executed.

In certain embodiments, data other than customer data 402 and/or standards data 403 may be received, in which case the solutions module 400 may be configured to remain in the "static loop" of steps 430 and 435 pending receipt of customer data 402 and/or standards data 403 so as to initiate execution of additional modules.

As previously mentioned, with reference again to FIG. 6, in any of these and still other various embodiments, if "newly received" data 402-403 is identified, the solutions module 400 proceeds to step 440; otherwise the module proceeds into a static loop via step 435. During step 435, the solutions module 400 may be configured to passively stand by for receipt of new data, in some embodiments for customer data 402 and/or standards data 403 in particular. In certain embodiments, the solutions module 400 may, in step 435, periodically (e.g., every 5 seconds, or at any desirable interval) proactively ping one or more databases contained therein. Various alternative data monitoring configurations may be envisioned, without departing the scope and nature of the present invention, as such are commonly known and understood in the art.

According to various embodiments, during step 440, the solutions module 400 is configured to execute the solutions tool 410. As illustrated in FIG. 6, in various embodiments, the execution of the solutions tool 410 according to step 440 may result in the generation of requirements data 415 at step 450. In various embodiments, execution of the solutions tool 410 may comprise steps for utilizing operational data, such as data associated with the solutions tool decision engine and/or standards data 403 in step 445. As previously described, the solutions tool decision engine may comprise one or more checklists 1100, 1200A-1200C for facilitating the collection of relevant customer data 402. As a non-limiting example, upon receipt of customer data 402 and with reference to the solutions tool decision engine, the solutions tool 410 may be configured to determine that certain items to be transported on behalf of a customer are temperature sensitive, and therefore cold-chain shipping services must be provided to meet the customer requirements. The solutions tool decision engine may comprise data indicative of issues historically identified during implementation of solutions for current and/or former customers of the carrier. Thus, the solutions tool 410 may be configured to determine whether comprehensive customer requirements for a particular customer must address concerns suggested by the solutions tool decision engine.

Moreover, in various embodiments, the solutions tool decision engine may comprise data indicative of various laws, regulations, rules, standards, and/or the like (collectively "regulations") that may impact how services are provided to a customer. For example, various regulations may specify that certain pharmaceutical products must be received by a registered doctor. As certain of these regulations may change over time, the solutions tool decision engine may be updated to reflect these changes. Moreover, upon receipt of standards data 403, which may comprise information regarding standard services currently and/or previously offered by the carrier, the solutions tool 410 may be configured to determine whether special services are required to meet the customer requirements. For example, upon a determination that a carrier must transport fragile vials containing immunizations, and the carrier does not currently offer services to guarantee that the vials will arrive at the intended destination intact, the requirements data 415 generated by the solutions tool 410 may indicate that special treatment of such shipments is necessary.

In reference to the solutions tool decision engine, the solutions tool 410 may request additional data from the customer prior to generating the requirements data 415. Such a request may be generated as an output of the solutions tool 410, and may be transmitted to the customer via the report module 700. The solutions tool may thus be configured to await receipt of a response prior to proceeding with generation of the requirements data 415.

In various embodiments, upon generation of requirements data 415, the solutions module 400 may be configured to transmit at least a portion of the requirements data 415 to at least the pricing module 500, and/or the implementation module 600 (see also FIG. 5) at step 460. In at least the illustrated embodiment, only a portion of the requirements data 415 is transmitted to the pricing module 500 (e.g., data indicative of any special procedures necessary to meet customer requirements), while other portions of the requirements data 415 is transmitted to the implementation module 600, either concurrently or subsequently thereto, as may be desirable. Of course, a variety of alternative combinations of data transmission to any combination of the modules 500-700 may be envisioned without departing the nature and scope of the embodiments described herein.

As mentioned, in these and other embodiments, transmission of one or more portions of data 415 to various modules 500-700 may be simultaneously, while in still other embodiments, transmission may be sequential and temporally spaced, as may be desirable or necessary for particular applications. For example, a first portion of the requirements data 415 may only be transmitted to the implementation module 600 (see FIG. 5) upon receipt thereby of pricing data 515 generated by the pricing module 500. As another non-limiting example, data 415 may only be transmitted to the implementation module 600 upon activation of its implementation tool 610. In any event, in these and still other embodiments, only a portion of the data may be transmitted automatically upon receipt thereof, while receipt of other data may not result in any automatic transmission thereof pending further subsequent activity that operates as a trigger for transmission of data.

Of course, various configurations may be envisioned, whereby, in certain embodiments, the solutions module 400 may be configured to automatically perform step 440, while in other embodiments, the module may perform such only periodically, at an interval predetermined by one or more users of the system 20, as may be desirable for particular applications. In any of these and still other embodiments, any portion of the data may be otherwise exchanged, whether automatically or upon request therefor, with or from the remaining module 500-700, as may be desirable for certain applications, as compared with the provision of such data from and by the solutions module 400 as an initiator thereof.

Pricing Module 500

According to various embodiments and as previously mentioned herein, the pricing module 500 is generally configured according to various embodiments to execute one or more tools (e.g., a pricing tool 510) that determines a pricing structure for the identified services to meet the customer requirements identified in the requirements data 415. Such a pricing structure may be determined based on expected costs to be incurred by the carrier in implementing the identified services.

Figure 7:
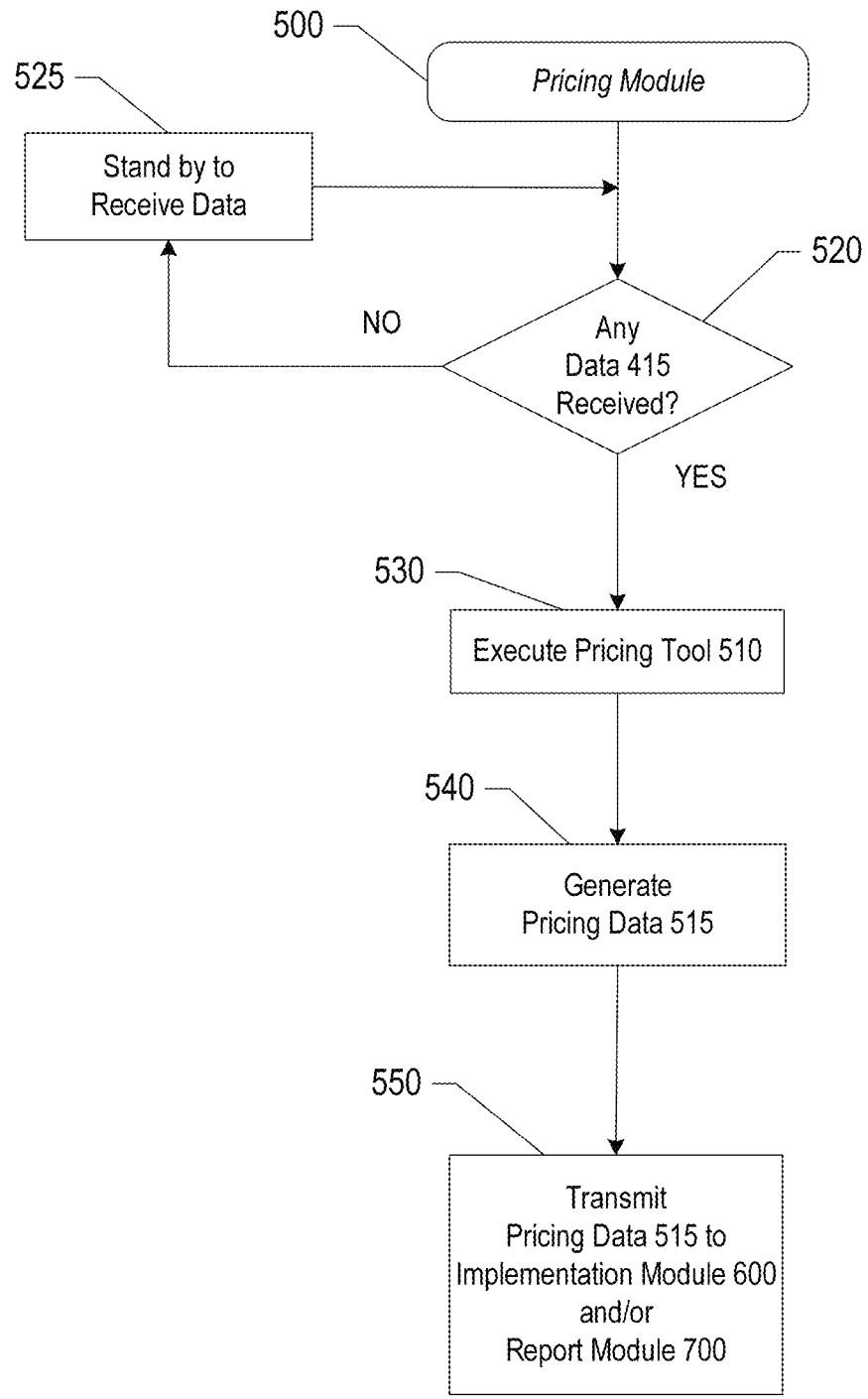
FIG. 7 illustrates an exemplary process flow according to various embodiments for the Pricing Module 500 shown in FIGS. 3 and 5.

FIG. 7 illustrates non-limiting and exemplary steps that may be executed by the pricing module 500 according to various embodiments. Beginning with step 520, the pricing module 500 according to various embodiments assesses whether any data (e.g., requirements data 415) has been received by the module. In certain embodiments, the pricing module 500 makes this assessment by periodically scanning one or more databases (see FIG. 4) associated with the module and by identifying some portion of data within one or more of the databases that was not present during a previous periodic scan under step 520. In other embodiments, the pricing module 500 makes this assessment by periodically scanning its internal module so as to see if some new portion of data has been received from the solutions module 400. Of course, alternative configurations may be envisioned, wherein, as a non-limiting example, the pricing module 500 may actively receive data (e.g., as input by a user of the system 20 via an interface, whether web-based or otherwise) and upon receipt thereof, execute step 530. As another non-limiting example, as has been referenced elsewhere herein, the pricing module 500 may be configured according to certain embodiments to automatically receive requirements data 415 from at least the solutions module 400 so as to in a real-time (or near real-time) fashion initiate execution of at least the pricing tool 510 upon identification of receipt thereof. In these and still other embodiments, data other than requirements data 415 may be received, in which case the pricing module 500 may be configured to remain in the "static loop" of steps 520 and 525 pending receipt of requirements data so as to initiate execution of pricing tool 510.

According to various embodiments and with continued reference to FIG. 7, it may be seen that execution of the pricing tool 510 according to step 530 generally results in generation of pricing data 515 in step 540. In certain embodiments, the pricing data 515 may comprise data indicative of a sustainable pricing structure to meet the customer requirements identified in the requirements data 415. In various embodiments, the pricing data 515 generated by the pricing tool 510 may be indicative of a current pricing structure for one or more standard services offered by the carrier. As a non-limiting example, such pricing data 515 may be indicative of a current pricing per dimensional-weight unit for standard ground shipping. In various embodiments, the pricing data 515 may be indicative of an estimated price to perform special services necessary in order to meet the customer requirements. As will be described in detail herein, upon a determination that no sustainable pricing structure is possible to meet the identified customer requirements, the pricing data 515 may be transmitted to the report module 700, and an alert 712 indicating that no sustainable pricing structure is generated.

Returning to FIG. 7, upon generation of the pricing data 515 in step 540, such may be transmitted to at least the implementation module 600 and/or the report module 700 in step 550. Transmission to the implementation module 600 is configured according to various embodiments to facilitate further analysis and evaluation of the procedures necessary for implementing the procedures necessary to meet the customer requirements identified in the requirements data 415. Transmission to the report module 700 may be beneficial where notification and/or further analysis and/or input by one or more users is desired prior to further proceeding (e.g., when no sustainable pricing structure is possible, when a pricing structure exceeding a defined threshold is reached, and/or the like). In this regard, various configurations and embodiments may be envisioned, without departing from the scope and intent of the present invention, which seeks to obtain detailed customer requirements data and to generate detailed plans for implementing processes necessary to meet the customer requirements prior to the carrier agreeing to work with the customer.

As mentioned, in these and other embodiments, transmission of the pricing data 515 to various modules 600-700 may be simultaneously, while in still other embodiments, transmission may be sequential and temporally spaced, as may be desirable or necessary for particular applications. For example, the pricing data 515 may be first transmitted to the report module 700, for example where confirmation is desirable from one or more users of the system prior to proceeding with further activities, as would be executed by the implementation module 600 upon transmission of the pricing data thereto. Still further, in any of these and still other embodiments, only a portion of the pricing data 515 or merely an indication or notification thereof or the existence thereof (e.g., as in an alert) may be transmitted automatically upon generation thereof, while generation of other portions of the pricing data may not result in any automatic transmission thereof pending further subsequent activity that operates as a trigger for transmission of data.

Of course, various configurations may be envisioned, whereby, in certain embodiments, the pricing module 500 may be configured to automatically perform step 550, while in other embodiments, the module may perform such only periodically, at an interval predetermined by one or more users of the system 20, as may be desirable for particular applications. In any of these and still other embodiments, any portion of the data may be otherwise exchanged, whether automatically or upon request therefor, with or from the remaining module 600-700, as may be desirable for certain applications.

Implementation Module 600

According to various embodiments and as previously mentioned herein, the implementation module 600 (see FIGS. 3 and 5) is configured to facilitate one or more tangible or physical activities designed to actually implement the realization of the services identified during the on-boarding process described herein, upon completion thereof. For example, the implementation module 600 may be configured in certain embodiments to facilitate identification of personnel necessary to implement the services required by the customer. Moreover, as will be described in greater detail herein, the implementation module 600 may be configured to monitor the implementation of the services identified during the on-boarding process by generating one or more KPIs by which to measure a level of success in implementation. In these and still other embodiments, it should be understood that the execution of the implementation module 600 corresponds substantially to performance of at least steps 1005-1009 of the process illustrated in FIG. 10.

Figure 8:
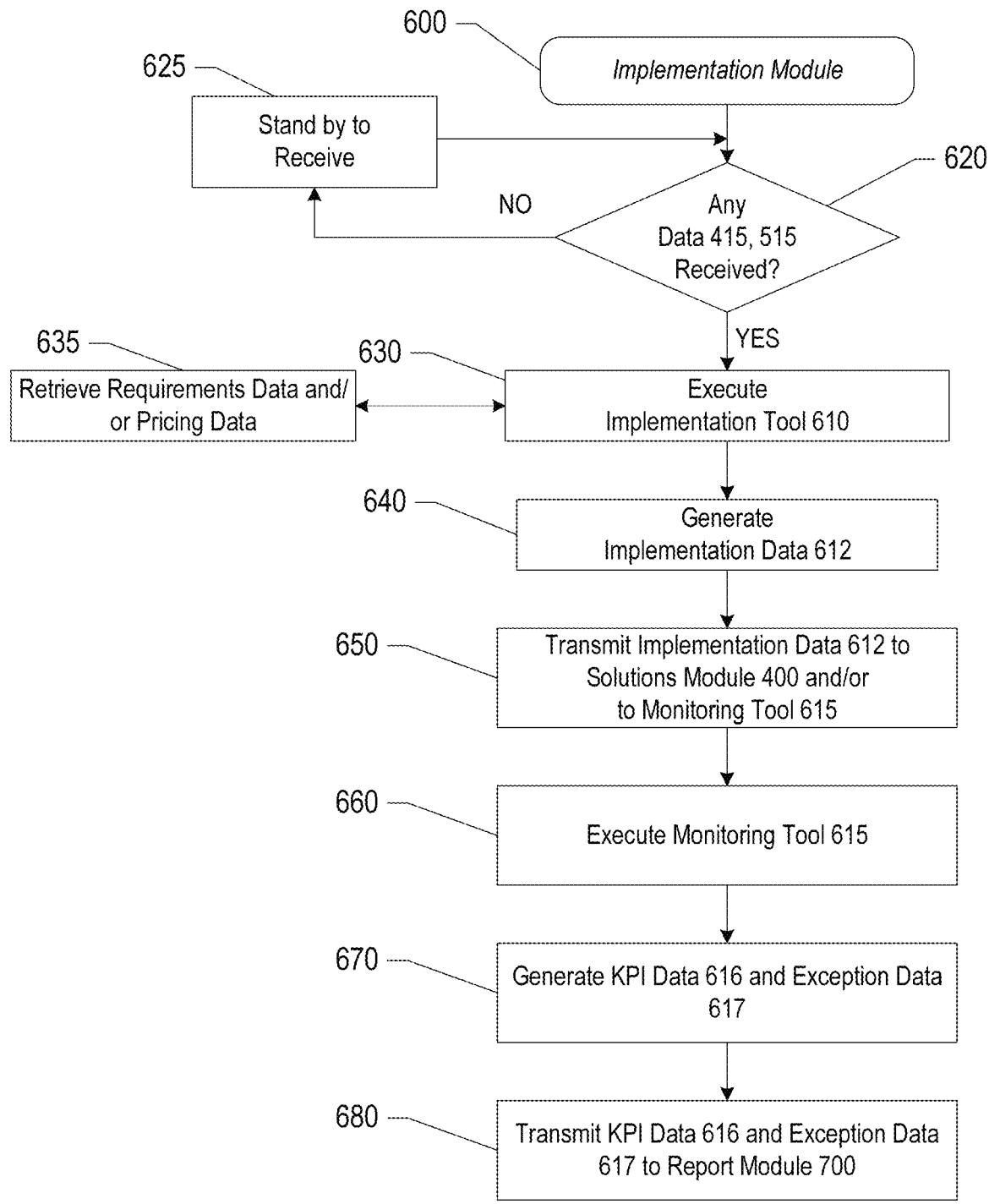
FIG. 8 illustrates an exemplary process flow according to various embodiments for the Implementation Module 600 shown in FIGS. 3 and 5.

FIG. 8 illustrates non-limiting and exemplary steps that may be executed by the implementation module 600 according to various embodiments, whereby if "newly received" data 415, 515 are identified in step 620, the implementation module 600 proceeds to step 630; otherwise the module proceeds into a static loop via step 625 pending receipt of new data. During step 625, the implementation module 600 may be configured to passively stand by for receipt of data. In certain embodiments, the implementation module 600 may, in step 625, periodically (e.g., every 5 seconds, or at any desirable interval) proactively ping at least the solutions module 400, however as may be desirable. Of course, various alternative data monitoring configurations may be envisioned, without departing the scope and nature of the present invention, as such are commonly known and understood in the art.

Remaining with FIG. 8, during step 630, the implementation module 600 is configured to execute an implementation tool 610, which is generally configured to, in step 640, generate implementation data 612. According to various embodiments, the implementation data 612 may comprise data indicative of the services necessary to meet the customer requirements identified in the requirements data 415, may identify personnel necessary for implementation of the services necessary to meet the customer requirements identified in the requirements data 415, and may assign various roles and/or tasks to each of the identified personnel. Moreover, the implementation data 612 may facilitate further determinations regarding necessary training for applicable carrier personnel prior to implementing the identified services. In various embodiments, the implementation tool 610 may be configured to generate implementation data only after receipt of approval from the customer. Moreover, in various embodiments, the implementation tool 610 may be configured to await approval from carrier personnel prior to generating the implementation data 612. Thus, the implementation tool 610 may operate as a logical gate (checkpoint) requiring user input prior to proceeding. Thus, the existence of implementation data 612 may be indicative of an intent to implement the identified services. As will be described herein, applicable personnel may be notified regarding the intent to implement the identified services upon the generation of the implementation data 612. In various embodiments, the implementation tool 610 may be configured to generate at least a portion of the implementation data 612 prior to receiving approval. The implementation tool 610 may be additionally configured to await such an approval, and may update the implementation data 612 to reflect the approval. Upon the implementation data 612 being updated, appropriate personnel may be notified. In various embodiments, the implementation data 612 may comprise computer generated code configured to instruct activities necessary to facilitate implementation of the identified services.

With further reference to FIG. 8, it should be understood that according to various embodiments, during execution of the implementation tool 610 in step 630, the implementation module 600 may be configured to further retrieve at least a portion of requirements data 415 from the solutions module 400 and/or pricing data 515 from the pricing module 500, however as may be necessary or desirable, all as illustrated in step 635. As a non-limiting example, the requirements data 415 may comprise one or more parameters, whether substantively or otherwise related, required for and associated with the implementation of shipping services required for delivery of pharmaceuticals to a hospital. Moreover, the pricing data 515 may comprise additional parameters indicative of the cost of services to be provided to meet the customer requirements.

Returning to FIG. 8, upon generation of the implementation data 612 in step 640, such may be transmitted to at least the solutions module 600 and/or a monitoring tool 615 in step 650. Transmission to the solutions module 400 is configured according to various embodiments to facilitate updating of the solutions tool decision engine described herein. As previously described, transmission to the solutions module 400 may be beneficial where additional information is identified during implementation of one or more services that may be useful in fully defining customer requirements.

Various configurations may be envisioned, whereby, in certain embodiments, the implementation module 600 may be configured to automatically perform step 650, while in other embodiments, the module may perform such only periodically, at an interval predetermined by one or more users of the system 20, as may be desirable for particular applications. In any of these and still other embodiments, any portion of the data may be otherwise exchanged, whether automatically or upon request therefor, with or from the remaining module 500, 700, as may be desirable for certain applications.

Referring again to FIG. 8, the implementation data 612 may be transmitted to the monitoring tool 615 at step 650. During step 660, the implementation module 600 is configured to execute the monitoring tool 615, which is generally configured to, in step 670, generate KPI data 616 and/or exception data 617. According to various embodiments, the KPI data 616 may be indicative of one or more KPIs that may be used to measure the level of success in implementing the services identified in the implementation data 612. Moreover, the KPI data 616 may comprise data indicative of an implementation status of the services identified in the implementation data 612. As a non-limiting example, the KPI data 616 may indicate that the percentage of deliveries made before an identified deadline is an appropriate KPI for measuring implementation of the services, and may indicate that, under the terms of the provided services, the carrier delivered 98% of packages prior to applicable deadlines.

The exception data 617 may be indicative of instances during which a provided service does not meet the customer requirements identified in the requirements data 415. For example, the exception data 617 may indicate that a particular delivery was not received prior to an applicable deadline. As another non-limiting example, for an item having a predetermined temperature requirement, exception data 617 may be generated upon the item being exposed to temperatures outside the predetermined range. Thus, the exception data 617 may be useful for identifying potential problems with the provided services.

With further reference to FIG. 8, it should be understood that according to various embodiments, during execution of the monitoring tool 615 in step 660, the implementation module 600 may be configured to receive data from various sources indicative of the implementation of the services identified in the implementation data 612. For example, the monitoring tool 615 may receive data from additional systems operated by the carrier via a network. Such data may be provided directly to the system 20 as user input (e.g., via a user interface) or as automatically generated data received from another system.

Returning to FIG. 8, upon generation of the KPI data 616 and/or exception data 617 in step 670, such may be transmitted to at least the report module 700 in step 680. Transmission to the report module 700 may be beneficial such that various alerts 712 and/or reports 715 may be generated and transmitted to appropriate users. For example, as will be described in greater detail herein, upon a determination that a particular delivery did not reach its intended destination prior to an applicable deadline, an alert 712 may be generated and transmitted to carrier personnel such that appropriate remedial actions may be taken. In this regard, various configurations and embodiments may be envisioned, without departing from the scope and intent of the present invention, which seeks to obtain detailed customer requirements data and to generate detailed plans for implementing processes necessary to meet the customer requirements prior to the carrier agreeing to work with the customer.

As mentioned, in these and other embodiments, transmission of the KPI data 616 and/or exception data 617 to the report module 700 may be simultaneous, while in still other embodiments, transmission may be sequential and temporally spaced, as may be desirable or necessary for particular applications. For example, the exception data 617 may be transmitted to the report module 700 immediately upon generation, such that appropriate remedial actions may be taken quickly. Thereafter, the KPI data 616 may be transmitted at regular intervals and/or upon the occurrence of a subsequent activity that operates as a trigger for transmission of data, such that reports 715 may be generated.

Of course, various configurations may be envisioned, whereby, in certain embodiments, the implementation module 600 may be configured to automatically perform step 680, while in other embodiments, the module may perform such only periodically, at an interval predetermined by one or more users of the system 20, as may be desirable for particular applications. In any of these and still other embodiments, any portion of the data may be otherwise exchanged, whether automatically or upon request therefor, with or from the remaining modules 400-500, as may be desirable for certain applications.

Report Module 700

According to various embodiments and as previously mentioned herein, the report module 700 (see FIGS. 3 and 5) is configured to generate periodic or timely alerts 712, reports 715, and/or instructions 716 (e.g., memos, check lists, source code, and/or the like) to one or more users and/or to one or more components of the system 20, as necessary to complete various steps of the on-boarding process (see at least steps 1003, 1004, and 1009 of FIG. 10).

Figure 9:
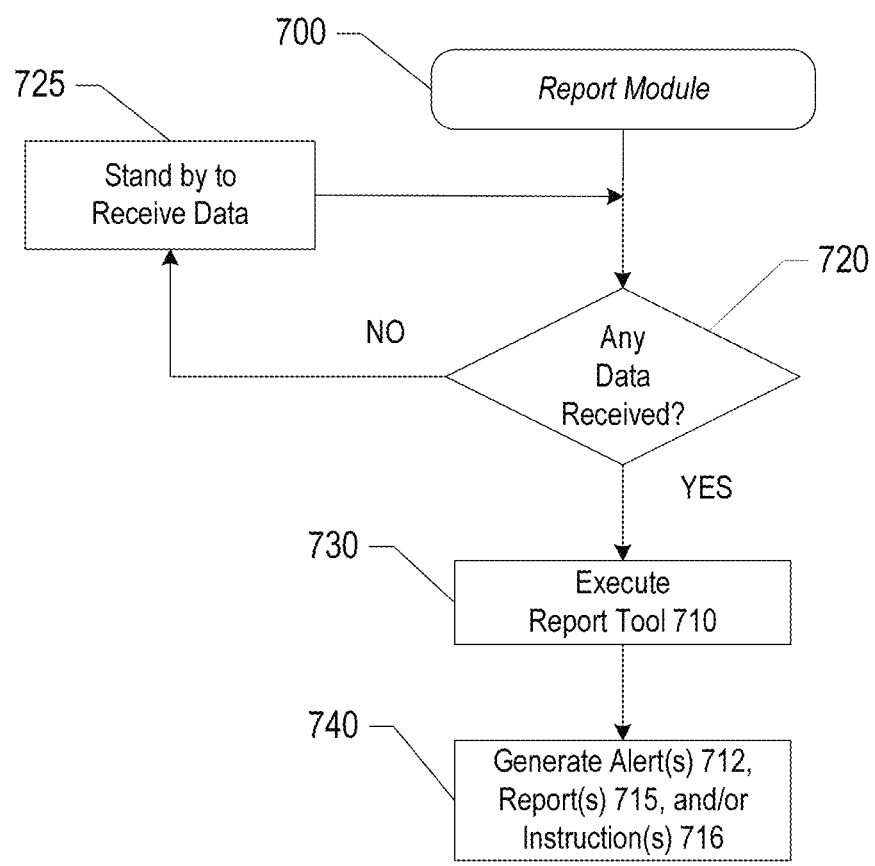
FIG. 9 illustrates an exemplary process flow according to various embodiments for the Report Module 700 shown in FIGS. 3 and 5.

FIG. 9 illustrates non-limiting and exemplary steps that may be executed by the report module 700 according to various embodiments, whereby if "newly received" data is identified in step 720, the report module 700 proceeds to step 730; otherwise the module proceeds into a static loop via step 725 pending receipt of new data. During step 725, the report module 700 may be configured to passively stand by for receipt of data. In certain embodiments, the report module 700 may, in step 725, periodically (e.g., every 5 seconds, or at any desirable interval) proactively ping one or more databases contained within one or more of the modules 400-600, however as may be desirable. Of course, various alternative data monitoring configurations may be envisioned, without departing the scope and nature of the present invention, as such are commonly known and understood in the art.

Remaining with FIG. 9, during step 730, the report module 700 is configured to execute a report tool 710, which is generally configured to generate one or more alerts 712 and/or one or more reports 715 in step 740. If pricing data 515 is identified as having been received, the report tool 710 may be configured to generate one or more alerts 712 to be transmitted to one or more users to facilitate a determination of whether customer requirements identified in the requirements data 415 may be met. Upon receipt of KPI data 616 and/or exception data 617, the report tool 710 may be configured to generate one or more alerts 712 to be transmitted to one or more users, and/or one or more reports 715 to be transmitted to one or more customers indicating the current status of the service implementation. Subsequent processing by the report tool 710 in each scenario is described, in turn, below.

Upon identification of receipt of pricing data 515, the report tool 710 is configured according to various embodiments to generate one or more alerts 712. For example, upon generation (by the pricing module 400) and receipt (by the report module 700) of the pricing data 515, an alert 712 indicative thereof may be generated and subsequently (which may include in a near real-time fashion or otherwise) transmitted to one or more users of the system 20. Via the report tool 710, the alert 712 may be transmitted thus at least to the carrier, who may, in return, indicate whether the proposed pricing of the services necessary to meet the customer requirements is acceptable (see Step 1003 of FIG. 10). In various embodiments, upon receipt of an indication that the proposed pricing of the services is acceptable, the report tool 710 may additionally generate one or more instructions to be executed by a computer processor (e.g., the processing device 308 of the server 200) and/or by a user of the system 20 to transmit or input certain data to the implementation tool 610 to satisfy the logical gate feature, as described herein. As a non-limiting example, the instructions 716 may be readable by a processing device, and may be performed automatically by the processing device upon receipt thereby. As another non-limiting example, the instructions 716 may comprise instructions readable by a user of the system 20, and may be performed manually by the user. With continued reference to FIG. 10, it should be understood that, as a non-limiting example, the generated pricing data 515 and the notification of the existence thereof to at least the common carrier provider (and possibly one or more additional or alternative users of the system 20 described herein) corresponds substantially to the completion of step 1003 and the initiation of step 1004 as illustrated in FIG. 10. Indeed, the determination of whether a particular service is feasible for implementation may be dependent at least in part on the pricing of those services. In this manner, at least a portion of the activities associated with steps 1003-1004 may be automated and/or at least electronically conducted via a combination of execution of the pricing tool 510 and the report tool 710. In such a scenario, the various alerts and/or reports may also be transmitted to at least personnel of the carrier, and may be indicative of the pricing data 515 or further indicative of potentially cost prohibitive aspects of the customer requirements. Indeed, a variety of additional and/or alternative report and/or alert configurations may be envisioned, as should be considered within the scope and nature of the disclosed embodiments.

Upon identification of receipt of KPI data 616, the report tool 710 is configured according to various embodiments to generate one or more alerts 712 and/or reports 715, in much the manner as described herein-above. With reference momentarily to FIG. 10, the generation of the alerts 712 and/or reports 715 may correspond substantially with step 1009, during which the status of the implementation of various services may be reported to carrier personnel and/or to the customer. Thus, via the report tool 710, the alert 712 and/or report 715 may be transmitted at least to the customer. The alerts 712 and/or reports 715 may be generated regularly or upon the occurrence of an event that acts as a trigger for the generation of the alerts 712 and/or reports 715. Indeed, in various embodiments, the report tool 710 may generate alerts 712 and/or reports 715 according to one or more customer-specified parameters that may be indicated in the requirements data 415.

Moreover, in various embodiments, the alerts 712 and/or reports 715 generated by the report tool 710 may each comprise content as specified by the customer in the requirements data 415. For example, the requirements data 415 may indicate that a particular customer requests specific content and/or formatting for reports transmitted to the customer. Indeed, a variety of additional and/or alternative report and/or alert configurations may be envisioned, as should be considered within the scope and nature of the disclosed embodiments. In various embodiments, the reports may comprise an invoice or accounting of services rendered for the customer.

Referring again to FIG. 9, upon identification of receipt of exception data 617, the report tool 710 is configured according to various embodiments to generate one or more alerts 712 and/or reports 715 indicative of the occurrence of an exception. As previously detailed herein, the exception data 617 may comprise data indicative of an event occurrence during which the customer requirements identified in the requirements data 415 are not met. As a non-limiting example, an occurrence during which a carrier delivering a package after an applicable deadline may be indicated in the exception data 617, and the report tool 710 may be configured to generate an alert 712 indicating the occurrence of such an exception. The alerts 712 and/or reports 715 generated by the report tool 710 indicative of the occurrence of an exception may be transmitted to one or more personnel of the carrier such that appropriate remedial action may be taken. In various embodiments, alerts 712 and/or reports 715 may be generated and transmitted to the customer indicative of the occurrence of an exception.

Indeed, a variety of alternatives reporting, alerting, and otherwise transmission of data may be envisioned, as may be performed via the report tool 710 according to various embodiments. In this regard, as a non-limiting example, it should be understood that while the alerts 712, reports 715, and instructions 716 described herein may be transmitted periodically and with differing timetables respective to one another, the basis of both generating and transmitting the same may also further differ. For example, alerts may be reserved for actions for which user (or third party entity) approval is necessary for further action, for example, where approval is necessary to implement special procedures to meet customer requirements, whether due to the cost incurred thereby or for alternative reasons. Reports may be simply informative, requiring no further positive action or interaction from the recipient thereof with the system 20. In such embodiments, reports, both with respect to content and the frequency thereof, may be established and even pre-established by any of the variety of users of the system, including non-users of the system to which notification or reporting may be mandated by various regulations or user preferences. Instructions 716 may detail one or more steps to be performed by the recipient of the instructions. Such instructions 716 may be machine readable instructions transmitted to and performed by a processing device (e.g., processing device 308 of server 200). The instructions may comprise human-readable instructions transmitted to a user of the system 20, and configured to be performed by the system user. Such instructions may be generated in response to the receipt of certain data, and consequently may be tailored to provide specific instructions based on the content of the received data. For example, upon receipt of data indicating that acceptable pricing data is unavailable for certain customer requirements, instructions 716 may be generated and transmitted to the implementation module 600 operating on a processing device instructing the implementation module 600 to stop further implementation of the necessary services. The formatting of such reports 712, alerts 715, and/or instructions 716 may also be customized, as may be desired for particular users of the system. Indeed, additional and/or alternative formats of reporting and/or communication may be envisioned without departing from the scope and intent of the present invention, and any of those, like those described previously herein, may be implemented in a manual or automatic fashion, electronically or otherwise, however as may be desirable.

On-Boarding Process Flow 900

Various embodiments of the present invention will now be described in reference to FIG. 10, which illustrates exemplary steps involved in an on-boarding process flow 900. As shown in FIG. 10, the process generally begins at step 1000, when a customer identifies a service need and/or transmits a request for bids ("RFB") to the carrier. The customer may communicate such a need to one or more personnel of the carrier, who may trigger the remainder of the process based on the information provided by the customer.

Upon a continuation of the identified process, the process continues with the execution of step 1001. In various embodiments, step 1001 and the remaining steps 1002-1009 may be executed at least in part via system 20. For example, various steps may be performed by one or more databases 150, central computing devices 110, central servers 200, distributed computing devices 120, and/or one or more handheld computing devices 300. Referring again to FIG. 10, step 1001 may be executed to determine a project scope and/or to develop one or more solutions to address the customer's requirements. During step 1001, the system 20 (e.g., via a solutions module 400) may utilize operational data, such as one or more checklists 1100, 1200A-1200C or other solutions tool decision engine to determine appropriate solutions to meet the customer's requirements. In various embodiments, the checklist 1100, 1200A-1200C or other solutions tool decision engine may be utilized to facilitate an identification of potential solutions that comply with any applicable government regulations and/or other particularized requirements for the services requested by the customer. For example, for the shipment of health-care related products (e.g., pharmaceuticals, sterilized medical tools, and/or the like), a carrier tasked with shipping these products from an origin to a destination may be required to comply with particular government regulations specifically applicable to the products being shipped. Moreover, the physical characteristics of the items being shipped may require special handling requirements by the carrier. For example, glass vials of pharmaceutical and/or biological products may require special care to ensure that the glass vials do not break during shipment. As illustrated in FIG. 10, the steps of developing solutions for particular customers, may be conducted exclusively by the carrier and/or personnel associated with the carrier. Such steps may additionally comprise steps for generating one or more requests for additional information from the customer regarding requested services. Such request may be based at least in part on the operational data (e.g., checklists), and may request additional information regarding various customer criteria for implementing the customer requirements. In various embodiments, steps for generating one or more requests for additional information may comprise generating instructions to be performed by a processing device (e.g., processing device 308 of the server 200) to generate the request and transmit the generated request to a user. Upon receipt of the requested additional data, the process may continue to identify potential solutions.

Figure 12C:

In various embodiments, a completed checklist 1100, 1200A-1200C must be obtained prior to proceeding to additional steps. Such checklists may facilitate identification of one or more key aspects for implementing services for the customer. In various embodiments, the data obtained from a completed checklist may be received by the solutions module 400, and may be utilized to generate the requirements data 415 that may be transmitted to various other modules 500-700. As non-limiting examples, the key aspects of a checklist 1100, 1200A-1200C may comprise: (1) manifesting solutions; (2) billing solutions; (3) visibility solutions; (4) customer input integration; (5) customer reporting needs; (6) Signature and/or Payment on Delivery requirements; (7) Product return services; (8) necessary field resources; (9) sustainability resources needed (e.g., package design and testing, warehouse layout and design, network optimization, business process reengineering, label services, and/or the like); (10) Standard Operating Procedures needed; (11) direct shipment requirements; (12) special requirements (e.g., cold temperature shipments, hazardous materials shipments, and/or the like); (12) program management needed; and/or the like. Exemplary checklists are provided in FIGS. 11 and 12A-12C. As shown in FIG. 11, a checklist 1100 may comprise a plurality of preliminary considerations for customer requirements. Such preliminary considerations may facilitate a determination of whether one or more current or historically offered services of the carrier may satisfy the customer requirements. FIGS. 12A-12C illustrate a detailed checklist 1200A-1200C that provides additional considerations for further determining detailed customer requirements. The checklist 1200A-1200C may, in various embodiments, comprise additional detail regarding those considerations identified in checklist 1100, and may be utilized after preliminary scoping of the customer requirements is completed. The checklists 1100, 1200A-1200C illustrated in FIGS. 11 and 12A-12C are provided as example checklists only, and the content of each of the checklists should not be construed as limiting.

Moreover, during the steps for identifying solutions for a particular customer, special services not currently and/or historically offered by the carrier may be identified as necessary to meet the customer requirements. Thus, the development of particularized solutions for a particular customer includes steps for comparing the needed services against a list of services currently and/or historically offered by the carrier. As illustrated in FIG. 10, such special operations are identified in step 1002 by the carrier. If customer requirements are identified that require solutions beyond the scope of current and/or historical services offered by the carrier, special operations configured to satisfy these requirements may be developed. Developing special operations may comprise steps for generating instructions to be performed by a processing device (e.g., processing device 308) that are indicative of the one or more special operations. Such instructions may facilitate the implementation of the one or more special operations by, for example, informing appropriate personnel of one or more features of the developed special operations.

For example, requirements to deliver one or more items to a specific location inside of a delivery address may be identified as a special operation. As an additional example, specific instructions for disposing of refused packages may be indicated as special operations. In various embodiments, carrier personnel approval may be required before implementation of the identified special requirements. Therefore, in various embodiments, one or more alerts may be generated during step 1002 to inform carrier personnel of the identified special operations. In various embodiments, approval of the special operations may require discussion among a special operations committee, and therefore such alerts may inform each member of the special operations committee of the need to discuss the identified special operations. Moreover, during step 1002, one or more standard operating procedures may be developed for the identified special operations. However, upon a determination that no special operations are necessary in order to comply with the customer's requirements, the process may proceed directly to steps for establishing a pricing structure for the services to be provided to the customer, as illustrated at step 1003.

Either upon the identification of any special operations at step 1002, or upon a determination that no special operations are needed, the process continues at step 1003, during which a pricing structure is established for the services to be provided to the customer. The process of establishing a pricing structure may comprise steps for identifying standard pricing strategies for standard services to be provided for the customer, and may be carried out by the pricing module 500. Such process may also comprise steps for establishing pricing for special operations not generally offered by the carrier. For example, such process may consider the amount of additional time and/or employees necessary to complete the special operations services, and/or the amount of oversight necessary to ensure that the services are properly provided. In various embodiments, such processes for establishing pricing practices for various services may be performed by or in reference to a computer-implemented pricing tool.

In instances in which no special services are necessary in implementing the customer requirements, the process may proceed directly to step 1005, during which the proposed solution is transmitted to the customer for review. Step 1005 will be described in greater detail herein.

Following the detailed methodology illustrated in FIG. 10, the process proceeds from step 1003 (establish pricing) to step 1004, during which the feasibility of implementing the solution is evaluated (e.g., by the implementation module 600). In various embodiments, step 1004 may only be included in evaluating special operations not typically performed by the carrier, however in various embodiments each and every project proposal may be evaluated according to step 1004. In determining the feasibility of a particular set of solutions, the expected cost of providing the one or more services may be evaluated against potential returns expected from providing such services to a customer. As described, step 1004 may serve as a checkpoint during which the carrier may determine whether to proceed with the remaining steps of the on-boarding process. Moreover, a determination of the feasibility of a particular solution may comprise steps for determining whether the carrier is likely to meet customer requirements established during step 1001. For example, if a customer requires a guarantee that a particular package be transported a distance of 100 miles in 90 minutes, the carrier may determine that such service may not be feasible when variations in transportation conditions are considered (e.g., weather and/or traffic-related congestion in travel paths, and/or the like).

Upon a determination that the solution is feasible (e.g., either based on the results of step 1004, and/or based on the fact that the solutions identified at step 1001 includes only standard solutions), the proposed solutions and/or pricing data regarding the proposed solutions are transmitted to the customer at step 1005. In various embodiments, the proposed solutions may be transmitted automatically, and/or in response to a particular event that acts as a trigger. Moreover, in various embodiments, the proposed solution may be presented to the customer together with an indication of expected value added to the customer's business by implementing the proposed solutions. For example, the expected value added may be indicative of expected cost savings and/or expected revenue increases that result from implementation of the proposed solutions.

At step 1006, a response communication is received from the customer. In those instances in which the response communication does not contain an approval of the proposed solutions, appropriate actions may be performed. For example, the proposed solutions may be modified, and updated proposed solutions may be transmitted to the customer for review and approval. Alternatively, the process may stop upon receipt of certain communications from the customer, such as communications indicating that the customer will not utilize the carrier for the proposed services.

After receipt of an approval communication from the customer indicating that the proposed solutions are acceptable, the process continues to step 1007, at which the responsible personnel are identified for the solution and notified of customer approval. In various embodiments, step 1007 may comprise processes for identifying an appropriate project manager for implementing the proposed solutions. Such identification process may be performed automatically, and/or in response to certain actions. Moreover step 1007 may additionally comprise establishing an implementation plan, in which various tasks may be assigned to one or more carrier personnel and the implementation scope may be compared against customer requirements and/or the established pricing strategy to ensure that the implementation plan complies with the identified customer requirements. In various embodiments, step 1007 may additionally comprise steps for identifying appropriate personnel of the customer who will be responsible for one or more tasks associated with implementing the solutions. Such customer personnel may be tasked with maintaining communications with the carrier and/or the system 20, and may be identified as the appropriate customer recipient for alerts and/or reports transmitted to the customer.

The proposed solutions are implemented at step 1008. Such solutions may be implemented as entirely computer-implemented processes and/or as processes implemented and/or monitored partially via a computer. For example, when implemented by a common carrier (e.g., United Parcel Service of America, Inc., Fed-Ex, DHL, Uber, and/or the like) the proposed solutions may comprise transportation of one or more items from an origin to a destination and computerized tracking and/or monitoring of the same. Therefore, such implementations may comprise processes performed in the physical realm and computer implemented processes.

As indicated at step 1009, the process may additionally include steps for monitoring the status of the implementation and generating reports and/or alerts indicative of the status of such implementation (e.g., via the report module 700). For example, one or more checklists 1100, 1200A-1200C may be implemented to ensure that all tasks necessary to satisfy customer requirements are being met. Moreover, one or more reports may be generated automatically to indicate the current status of the implementation. The contents of the report may be determined based at least in part on identified customer requirements identifying required content and/or formatting of received reports. Thus, in various embodiments, appropriate reports may be automatically generated based on identified customer requirements. Moreover, in various embodiments, step 1009 may comprise steps for generating one or more alerts to inform a user of any circumstances in which the implementation did not meet the customer requirements. For example, upon a determination that a particular shipment arrived at its intended destination including one or more broken items (e.g., broken vials of pharmaceuticals), an alert may be generated and transmitted to one or more carrier personnel, who may then take appropriate remedial action.

The step for monitoring the implementation of the solutions may additionally comprise generation of one or more KPIs indicative of the level of success of a particular solution. In various embodiments, at least a portion of the KPIs may comprise one or more thresholds indicating a particular KPI does not comply with one or more customer requirements. For example, upon receipt of data indicating that a particular KPI does not comply with the integrated threshold, an alert may be generated and transmitted to one or more carrier personnel such that appropriate remedial action may be taken.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for developing customer-specific service solutions for providing transportation services for health-care related items by a carrier, said system comprising:
one or more memory storage areas having operational data stored therein, wherein the operational data is indicative of (1) one or more general services offered by the carrier and or (2) requirements for shipping one or more health-care related items, the requirements for shipping the one or more health-care related items being based at least in part upon and periodically updated based at least in part upon regulatory data governing shipping of the one or more health-care related items; and
one or more processors collectively configured to:
receive customer requirement data indicative of requested services from a customer device for shipping of the one or more health-care related items;
generate and transmit, over a network and to the customer device having an interactive interface thereon, an inquiry containing an indication of one or more possible service criteria for the requested services, wherein at least a portion of the inquiry is generated based at least in part on the operational data;
determine, based at least in part on response data, whether the requested services may be satisfied by the one or more general services offered by the carrier; and
upon a determination that the requested services cannot be satisfied by the general services;
determine one or more special operations necessary to satisfy the requested services, wherein the one or more special operations are not included in the one or more general services offered by the carrier and include at least one criteria for special handling of the one or more health-care related items during the shipment thereof;
automatically calculate a proposed value proposition structure for the requested services based at least in part on one or both of an amount of additional time and one or more additional employees necessary to complete the one or more special operations, wherein the proposed value proposition structure includes at least one value for completing the required services and the one or more special operations necessary to satisfy the requested services;

generate and transmit, over the network and to a user interface of a carrier device, a selectable indication of the proposed value proposition structure;

responsive to receipt of a selection from the carrier device indicating that the proposed value proposition structure is acceptable, generate and automatically execute special operations instructions indicative of and configured to automatically implement the one or more special operations necessary to satisfy the requested services and the requirements for shipping the one or more health-care related items, the special operations instructions including one or more of a project plan report, a checklist and a timeline; and upon implementation of the one or more special operations via automatic execution of the special operations instructions, automatically and periodically monitor implementation activities using one or more key performance indicators to measure a level of success of implementation of the one or more special operations, wherein the one or more key performance indicators indicate an implementation status of the special operations instructions;

receive an indication of completion of a special operation instruction in first format based on the periodic monitoring of the implementation activities;

automatically generate in real-time, one or more reports to be transmitted to one or more user devices, the one or more reports generated by a report module executed by the processor which generates the one or more reports by converting the indication from the first format to a second format based on one or more formatting requirements by one or more users, the one or more user devices including the customer device, the carrier device, and personnel devices associated with personnel responsible for the requested services, the one or more users having different formatting requirements from the first format; and automatically transmit the one or more reports to the one or more user devices in real-time.

2. The system of claim 1, wherein:

special operations data is indicative of a cost to implement the one or more special operations; and the processors are further configured to, prior to transmitting the indication of the proposed value proposition structure to the carrier device, determine, based at least in part on the special operations data and the value data, whether the proposed value proposition structure satisfies the cost to implement the one or more special operations.

3. The system of claim 1, wherein the processors are further configured to: generate an alert to be transmitted to the customer device indicative of the proposed value proposition pricing structure and the special operations data.

4. The system of claim 1, wherein the processors are further configured to: identify the personnel associated with the carrier to be responsible for the requested services from a database of available personnel.

5. The system of claim 1, wherein the processors are further configured, via the periodic monitoring, to:

generate, based at least in part on the response data, the one or more key performance indicators for the requested services;

receive implementation data indicative of the status of one or more requested services of the requested services being implemented; and upon a determination that one or more of the requested services being implemented does not satisfy the one or more key performance indicators, generate an alert.

6. The system of claim 5, wherein the processors are further configured to: generate a failure report to be transmitted to at least one of the carrier device or the customer device.

7. The system of claim 5, wherein the processors are further configured to: update, based on the implementation data, the operational data.

8. The system of claim 1, wherein the processors are further configured to:

periodically receive updates, over the network and from a third party source, wherein the updates include updates to regulatory data governing requirements for shipping one or more health-care related items; and automatically update, based at least in part on the updated regulatory data, the operational data.

9. A computer-implemented method for developing customer-specific solutions, said method comprising the steps of:

receiving and storing within one or more memory storage areas customer requirement data indicative of requested services for a customer for shipping of one or more health-care related items;

generating and transmitting, via at least one computer processor and over a network to a customer device having an interactive interface thereon, an inquiry containing an indication of one or more possible service criteria for the requested services, wherein at least a portion of the request data is generated based at least in part on operational data, wherein said operational data is indicative of (1) one or more general services offered by the carrier and (2) requirements for shipping the one or more health-care related items, the requirements for shipping the one or more health-care related items being based at least in part upon and periodically updated based at least in part upon regulatory data governing shipping of the one or more health-care related items;

receiving response data from the customer device, the response data being indicative of a user selection of at least one service criteria from the one or more possible service criteria;

determining, via execution of at least one tool within said at least one computer processor and based at least in part on the response data, whether the requested services may be satisfied by the one or more general services offered by the carrier; and upon a determination that the requested services cannot be satisfied by the general services;

determining, via execution of at least one tool within said at least one computer processor, one or more special operations necessary to satisfy the requested services, wherein the one or more special operations are not included in the one or more general services offered by the carrier and include at least one criteria for special handling of the one or more health-care related items during the shipment thereof;

automatically calculating, via said at least one computer processor, a proposed value proposition structure for the requested services based at least in part on one or both of an amount of additional time and one or more additional employees necessary to complete the one or more special operations, wherein the proposed value proposition structure includes at least one value for completing the required services and the one or more special operations necessary to satisfy the requested services;

generating and transmitting, over the network and to a user interface of a carrier device, a selectable indication of the proposed value proposition structure;

responsive to receipt of a selection from the carrier device indicating that the proposed value proposition structure is acceptable, generating and automatically executing, via said at least one computer processor, special operations instructions indicative of and configured to automatically implement the one or more special operations necessary to achieve the requested services and the requirements for shipping the one or more health-care related items, the special operations instructions including one or more of a project plan report, a checklist or a timeline; and upon implementation of the one or more special operations via automatic execution of the special operations instructions, automatically and periodically monitoring, via said at least one computer processor, implementation activities using one or more key performance indications to measure a level of success of implementation of the one or more special operations, wherein the one or more key performance indicators indicate an implementation status of the special operations instructions;

receiving, via said at least one computer processor, an indication of completion of a special operation instruction in first format based on the periodic monitoring of the implementation activities;

automatically generating in real-time, via a report module executed by said at least one computer processor, one or more reports to be transmitted to one or more user devices, the one or more reports generated by converting the indication from the first format to a second format based on one or more customized formatting conditions provided by one or more users, the one or more user devices including the customer device, the carrier device, and personnel devices associated with personnel responsible for the requested services; and automatically transmitting, over the network and to an interface to the one or more user devices, the one or more reports in real-time.

10. The computer-implemented method of claim 9, wherein:

special operations data is indicative of a cost to implement the one or more special operations; and further comprising step of, prior to transmitting the indication of the proposed value proposition structure to the carrier device, determining, via said at least one computer processor and based at least in part on the special operations data and the value data, whether the proposed value proposition structure satisfies the cost to implement the one or more special operations.

11. The computer-implemented method of claim 9, further comprising steps of generating, via said at least one computer processor, an alert to be transmitted to the user interface of the customer device indicative of the proposed value proposition structure and the special operations data.

12. The computer-implemented method of claim 9, further comprising steps of identifying, via said at least one computer processor, the personnel associated with the carrier to be responsible for the requested services from a database of available personnel.

13. The computer-implemented method of claim 9, further comprising, during the periodic monitoring, the steps of:

generating, via said at least one computer processor and based at least in part on the response data, the one or more key performance indicators for the requested services;

receiving, via said at least one computer processor, implementation data indicative of the status of one or more requested services of the requested services being implemented; and upon a determination that one or more of the requested services being implemented does not satisfy the one or more key performance indicators, generating, via said at least one computer processor, an alert.

14. The computer-implemented method of claim 13, further comprising steps of generating, via said at least one computer processor and based at least in part on the implementation data, a failure report to be transmitted to at least one of the carrier device or the customer device.

15. The computer-implemented method of claim 13, further comprising steps of: updating, via said at least one computer processor and based on the implementation data, the operational data.

16. The computer-implemented method of claim 9, further comprising steps of:

periodically receiving, via said at least one computer processor, over the network and from a third party source, updates to the regulatory data governing requirements for shipping one or more health-care related items; and automatically updating, via said at least one computer processor and based at least in part on the updated regulatory data, the operational data.

17. A computer program product comprising at least one non-transitory computer-readable storage medium having computer-readable program code portions embodied therein, the computer-readable program code portions comprising one or more executable portions configured for:

receiving customer requirement data indicative of requested services for a customer for shipping of one or more health-care related items;

generating and transmitting over a network to a customer device having an interactive interface thereon an inquiry containing an indication of one or more possible service criteria for the requested services, wherein at least a portion of the request data is generated based at least in part on operational data, wherein said operational data is indicative of (1) one or more general services offered by the carrier and (2) requirements for shipping the one or more health-care related items, the requirements for shipping the one or more health-care related items being based at least in part upon and periodically updated based at least in part upon regulatory data governing shipping of the one or more health-care related items;

receiving response data from the customer device, the response data being indicative of a user selection of at least one service criteria from the one or more possible service criteria;

determining, based at least in part on the response data, whether the requested services may be satisfied by the one or more general services offered by the carrier; and upon a determination that the requested services cannot be satisfied by the general services;

determining one or more special operations necessary to satisfy the requested services, wherein the one or more special operations are not included in the one or more general services offered by the carrier and include at least one criteria for special handling of the one or more health-care related items during the shipment thereof;

automatically calculating a proposed value proposition structure for the requested services based at least in part on one or both of an amount of additional time and one or more additional employees necessary to complete the one or more special operations, wherein the proposed value proposition structure includes at least one value for completing the required services and the one or more special operations necessary to satisfy the requested services;

generating and transmitting, over the network and to a user interface of a carrier device, a selectable indication of the proposed value proposition structure;

responsive to receipt of a selection from the carrier device indicating that the proposed value proposition structure is acceptable, generating and automatically executing, special operations instructions indicative of and configured to automatically implement the one or more special operations necessary to achieve the requested services and the requirements for shipping the one or more health-care related items, the special operations instructions including one or more of a project plan report, a checklist or a timeline; and upon implementation of the one or more special operations via automatic execution of the special operations instructions, automatically and periodically monitoring implementation activities using key performance indicators, the periodic monitoring being configured to measure a level of success of implementation of the one or more special operations, wherein the key performance indicators indicate an implementation status of the special operations instructions;

receiving an indication of completion of a special operation instruction in first format based on the periodic monitoring of the implementation activities;

automatically generating in real-time, one or more reports to be transmitted to one or more user devices, the one or more reports generated by a report module executed by the processor which generates the one or more reports by converting the indication from the first format to a second format based on one or more formatting requirements by one or more users, the one or more user devices including the customer device, the carrier device, and personnel devices associated with personnel responsible for the requested services; and automatically transmitting the one or more reports to the one or more user devices in real-time.

* * * * *

UNITED STATES PATENT AND TRADEMARK OFFICE
CERTIFICATE OF CORRECTION

PATENT NO. : 10,963,831 B2
APPLICATION NO. : 14/601777
DATED : March 30, 2021
INVENTOR(S) : Todd Snyder It is certified that error appears in the above-identified patent and that said Letters Patent is hereby corrected as shown below:

On the Title Page

In Column 2, item (56), Other Publications, Line 1, delete "RUthayakunnar," and insert -- R. Uthayakumar, --, therefor.

In the Claims

In Column 28, Line 36, Claim 1, delete "and or" and insert -- and/or --, therefor.

In Column 29, Line 58, Claim 3, before "structure" delete "pricing".

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*